US010367566B2

(12) United States Patent
Sun et al.

(10) Patent No.: US 10,367,566 B2
(45) Date of Patent: Jul. 30, 2019

(54) TECHNIQUES FOR NON-COHERENT JOINT TRANSMISSIONS IN WIRELESS COMMUNICATIONS

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 15/667,801

(22) Filed: Aug. 3, 2017

(65) Prior Publication Data

US 2018/0048372 A1 Feb. 15, 2018

Related U.S. Application Data

(60) Provisional application No. 62/374,603, filed on Aug. 12, 2016.

(51) Int. Cl.
*H04B 7/06* (2006.01)
*H04L 1/00* (2006.01)
(Continued)

(52) U.S. Cl.
CPC .......... *H04B 7/0632* (2013.01); *H04B 7/024* (2013.01); *H04B 7/0639* (2013.01);
(Continued)

(58) Field of Classification Search
CPC .. H04B 7/0632; H04B 7/0686; H04B 7/0639; H04B 7/024; H04L 5/003; H04L 1/0026
See application file for complete search history.

(56) References Cited

U.S. PATENT DOCUMENTS 9,755,706 B2 * 9/2017 Geirhofer .............. H04B 7/024
10,014,911 B2 * 7/2018 Marinier ................ H04B 7/024
(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 13)", 3GPP Standard; 3GPP TS 36.212, 3rd Generation Partnership Project (3GPP), Mobile Competence Centre; 650, Route Des Lucioles; F-06921 Sophia-Antipolis Cedex; France, vol. RAN WG1, No. V13.2.0, Jun. 30, 2016 (Jun. 30, 2016), pp. 1-140, XP051123279, [retrieved on Jun. 30, 2016].
(Continued)

*Primary Examiner* — Brandon J Miller
(74) *Attorney, Agent, or Firm* — Holland & Hart LLP

(57) ABSTRACT

Multiple base stations or transmit points (TPs) may use single-user multiple-input multiple-output (SU-MIMO) layer-specific and codeword-specific communication configurations for non-coherent joint transmissions (NCJTs) to a user equipment (UE). Two TPs may be configured for NCJTs to the UE, and one or more of the TPs may transmit a set of communication configurations to the UE. The communication configurations may be transmitted in a single downlink control information (DCI) transmission that configures the UE to receive NCJTs as two codewords in a SU-MIMO transmission. The UE may receive the DCI, receive the multiple NCJTs, and demodulate/decode the NCJT transmissions as multiple codewords in a SU-MIMO transmission. In some cases, the two codewords may be received from two TPs. Alternatively, the two codewords may be received in two spatial layers transmitted from a single TP.

65 Claims, 22 Drawing Sheets

(51) Int. Cl.
H04L 5/00 (2006.01)
H04B 7/024 (2017.01)
(52) U.S. Cl.
CPC .......... H04B 7/0686 (2013.01); H04L 5/003 (2013.01); *H04L 1/0026* (2013.01)

(56) References Cited

U.S. PATENT DOCUMENTS

| | | | | | |
|---|---|---|---|---|---|
| 2012/0213167 | A1* | 8/2012 | Xu | ...................... | H04B 7/0413 370/329 |
| 2013/0114656 | A1* | 5/2013 | Sayana | .................. | H04B 7/024 375/219 |
| 2014/0044061 | A1* | 2/2014 | Yue | ..................... | H04W 72/042 370/329 |
| 2014/0369293 | A1* | 12/2014 | Guo | ..................... | H04L 5/0073 370/329 |
| 2015/0304997 | A1* | 10/2015 | Park | ....................... | H04B 7/024 370/330 |
| 2016/0028521 | A1* | 1/2016 | Shimezawa | ............ | H04J 11/005 370/329 |
| 2016/0248561 | A1* | 8/2016 | Davydov | ............... | H04B 7/024 |
| 2018/0102877 | A1 | 4/2018 | Jiang et al. | | |

OTHER PUBLICATIONS

International Search Report and Written Opinion—PCT/US2017/045448—ISA/EPO—dated Jan. 12, 2018.
Qualcomm Incorporated: "Enhancement to Control Signaling for NCJT", 3GPP Draft; R1-1705005 Enhancement to Control Signaling for NCJT, 3rd Generation Partnership Project (3GPP), Mobile Competence Centre; 650, Route Des Lucioles; F-06921 Sophia-Antipolis Cedex; France vol. RAN WG1, No. Spokane, USA: Apr. 3, 2017-Apr. 7, 2017 Mar. 25, 2017 (Mar. 25, 2017), 3 pages, XP051251680, Retrieved from the Internet: URL: http://www.3gpp.org/ftp/tsg_ran/WG1_RL1/TSGR1_88b/Docs/ [retrieved on Mar. 25, 2017].
Partial International Search Report—PCT/US2017/045448—ISA/EPO—dated Nov. 7, 2017.
Intel Corporation: "Initial evaluation results for non-coherent JT", 3GPP Draft; R1-164170 Initial Evaluation Results for Non Coherent JT, 3rd Generation Partnership Project (3GPP), Mobile Competence Centre; 650, Route Des Lucioles; F-06921 Sophia-Antipolis Cedex; F, vol. RAN WG 1, No. Nanjing, China; May 23, 2016-May 27, 2016 May 14, 2016 (May 14, 2016), 5 pages, XP051096549, Retrieved from the Internet:url:%20http://www.3gpp.org/ftp/tsg_ran/WG1_RL%201/TSGR1_85/Docs/ [retrieved on May 14, 2016].
Qualcomm Incorporated: "Enhancements for Non-Coherent Joint Transmission", 3GPP Draft; R1-166317 Enhancements for Noncoherent JT, 3rd Generation Partnership Project (3GPP), Mobile Competence Centre; 650, Route Des Lucioles; F-06921 Sophia-Antipolis Cedex; France vol. RAN WG1, No. Gothenburg, Sweden; Aug. 22, 2016-Aug. 26, 2016 Aug. 13, 2016 (Aug. 13, 2016), 6 pages, XP051142332, Retrieved from the Internet: URL: http://www.3gpp.org/ftp/tsg_ran/WG1_RL1/TSGR1_86/Docs/ [retrieved on Aug. 13, 2016].
ZTE Corporation., et al., "Potential Enhancements for Joint Transmission", 3GPP Draft; R1-164302 Potential Enhancements for Joint Transmission, 3rd Generation Partnership Project (3GPP), Mobile Competence Centre; 650, Route Des Lucioles; F-06921 Sophia-Antipolis Cedex; FR vol. RAN WG1, No. Nanjing, China; May 23, 2016-May 27, 2016 May 14, 2016 (May 14, 2016), 3 pages, XP051096497, Retrieved from the Internet: URL:http://www.3gpp.org/ftp/tsg_ran/WG1_RL%201%20/TSGR1_85/Docs/ [retrieved on May 14, 2016].

* cited by examiner

TECHNIQUES FOR NON-COHERENT JOINT TRANSMISSIONS IN WIRELESS COMMUNICATIONS

CROSS REFERENCES

The present application for patent claims priority to U.S. Provisional Patent Application No. 62/374,603 by Sun, et al., entitled "Techniques For Non-Coherent Joint Transmissions in Wireless Communications," filed Aug. 12, 2016, assigned to the assignee hereof.

BACKGROUND

The following relates generally to wireless communication, and more specifically to techniques for non-coherent joint transmissions in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a UE may communicate with more than one base station using coordinated multi-point (CoMP) operations. However, in some systems joint transmission CoMP operations may be based on coherent transmissions from each base station. Coherent transmissions may not be available for base stations that have a less than ideal backhaul, which can limit the usefulness of joint transmissions and reduce overall system throughput.

SUMMARY

A user equipment (UE) and multiple base stations or transmit points (TPs) may use single-user multiple-input multiple-output (SU-MIMO) layer-specific and codeword-specific communication configurations for non-coherent joint transmissions (NCJT) to the UE. In some examples, two TPs may be configured for NCJT transmissions to the UE, and one or more of the TPs may transmit a set of communications configurations to the UE. The communications configurations may be transmitted in a single downlink control information (DCI) transmission that configures the UE to receive NCJT transmissions as two codewords in a SU-MIMO transmission. The UE may receive the DCI, and receive the multiple NCJT transmissions from the two TPs, and demodulate/decode the NCJT transmissions as multiple codewords in a SU-MIMO transmission.

A method of wireless communication is described. The method may include identifying a first portion of a NCJT for transmission from a first TP to a UE, and a second portion of the NCJT for transmission from a second TP to the UE, formatting the first portion into a first codeword that may be received at the UE as a first codeword of a SU-MIMO transmission and the second portion into a second codeword that may be received at the UE as a second codeword of a SU-MIMO transmission, and transmitting the first portion or the second portion to the UE.

An apparatus for wireless communication is described. The apparatus may include means for identifying a first portion of a NCJT for transmission from a first TP to a UE, and a second portion of the NCJT for transmission from a second TP to the UE, means for formatting the first portion into a first codeword that may be received at the UE as a first codeword of a SU-MIMO transmission and the second portion into a second codeword that may be received at the UE as a second codeword of a SU-MIMO transmission, and means for transmitting the first portion or the second portion to the UE.

Another apparatus for wireless communication is described. The apparatus may include a processor, memory in electronic communication with the processor, and instructions stored in the memory. The instructions may be operable to cause the processor to identify a first portion of a NCJT for transmission from a first TP to a UE, and a second portion of the NCJT for transmission from a second TP to the UE, format the first portion into a first codeword that may be received at the UE as a first codeword of a SU-MIMO transmission and the second portion into a second codeword that may be received at the UE as a second codeword of a SU-MIMO transmission, and transmit the first portion or the second portion to the UE.

A non-transitory computer readable medium for wireless communication is described. The non-transitory computer-readable medium may include instructions operable to cause a processor to identify a first portion of a NCJT for transmission from a first TP to a UE, and a second portion of the NCJT for transmission from a second TP to the UE, format the first portion into a first codeword that may be received at the UE as a first codeword of a SU-MIMO transmission and the second portion into a second codeword that may be received at the UE as a second codeword of a SU-MIMO transmission, and transmit the first portion or the second portion to the UE.

In some examples of the method, apparatus, and non-transitory computer-readable medium described above, the formatting further comprises allocating resource blocks for each of the first portion and the second portion to provide aligned resource blocks at the UE. Some examples of the method, apparatus, and non-transitory computer-readable medium described above may further include processes, features, means, or instructions for transmitting a transmission from only the first TP, the transmission formatted into two codewords in two spatial layers transmitted from the first TP. Some examples of the method, apparatus, and non-transitory computer-readable medium described above may further include processes, features, means, or instructions for configuring the UE to receive the NJCT in a single DCI transmission.

In some examples of the method, apparatus, and non-transitory computer-readable medium described above, the DCI comprises one or more parameters to configure the UE to receive the NJCT from both the first TP and the second TP, or to configure the UE to receive two codewords in two spatial layers from either the first TP or the second TP. In some examples of the method, apparatus, and non-transitory computer-readable medium described above, the one or more parameters comprise one or more of an index to a table defining quasi co-location (QCL) information for each of the first TP and the second TP. In some examples of the method, apparatus, and non-transitory computer-readable medium described above, the index comprises a plurality of bits of information to indicate a combination of QCL information in the table. In some examples of the method, apparatus, and non-transitory computer-readable medium described above, the different combinations in the table indicate whether the UE is to receive the NJCT from both the first TP and the second TP, or the UE is to receive from only one of the first TP or the second TP. In some examples of the method, apparatus, and non-transitory computer-readable medium described above, the plurality of bits of information jointly encode the QCL for both the first TP and the second TP. In some examples of the method, apparatus, and non-transitory computer-readable medium described above, the plurality of bits of information comprise two fields that separately specify the QCL for the first TP and the second TP.

In some examples of the method, apparatus, and non-transitory computer-readable medium described above, the DCI comprises a field to indicate the antenna ports, scrambling ID, and number of layers for each of the first codeword and the second codeword. In some examples of the method, apparatus, and non-transitory computer-readable medium described above, the antenna ports, scrambling ID, and number of layers field, when only the first TP or the second TP may be a serving cell, provides a same structure as a legacy SU-MIMO DCI information, and when both the first TP and the second TP may be serving cells, provides support for any available number of spatial layers for the first codeword and the second codeword. In some examples of the method, apparatus, and non-transitory computer-readable medium described above, the antenna ports, scrambling ID, and number of layers field uses a same format as a same field in a legacy SU-MIMO configuration, and a number of spatial layers of the combination of the first codeword and the second codeword may be the same as provided in the legacy SU-MIMO configuration. In some examples of the method, apparatus, and non-transitory computer-readable medium described above, the antenna ports, scrambling ID, and number of layers field further includes a swapping bit that indicates that the first codeword and second codeword in the antenna ports, scrambling ID, and number of layers field may be for the second TP and first TP respectively, instead of for the first TP and second TP respectively.

Some examples of the method, apparatus, and non-transitory computer-readable medium described above may further include processes, features, means, or instructions for configuring the UE to perform channel state information (CSI) processes or each of the first TP and the second TP. In some examples of the method, apparatus, and non-transitory computer-readable medium described above, the CSI processes comprise a first CSI process that assumes the first TP may be a serving cell for the UE and a second CSI process that assumes the second TP may be the serving cell for the UE.

In some examples of the method, apparatus, and non-transitory computer-readable medium described above, the CSI processes comprise a first CSI process that assumes the first TP may be a serving cell for the UE, a second CSI process that assumes the second TP may be the serving cell for the UE, and a third CSI process that that assumes both the first TP and the second TP may be the serving cells for the UE. In some examples of the method, apparatus, and non-transitory computer-readable medium described above, the third CSI process bundles a separate CSI process for each of the first TP and the second TP.

In some examples of the method, apparatus, and non-transitory computer-readable medium described above, the third CSI process jointly encodes information from separate CSI process for each of the first TP and the second TP.

In some examples of the method, apparatus, and non-transitory computer-readable medium described above, the first CSI process and second CSI process each contain a rank indicator (RI), precoding matrix indicator (PMI), and a channel quality indicator (CQI) for the first TP and the second TP, respectively. In some examples of the method, apparatus, and non-transitory computer-readable medium described above, the RI in the CSI processes may be restricted to cover a maximum total rank. In some examples of the method, apparatus, and non-transitory computer-readable medium described above, the third CSI process contains two sets of RI, PMI, and CQI when both the first TP and the second TP may be serving cells, and provides support for any available number of spatial layers for the first codeword and the second codeword. In some examples of the method, apparatus, and non-transitory computer-readable medium described above, the third CSI process jointly encodes contains two sets of RI, PMI, and CQI when both the first TP and the second TP may be serving cells, and provides support for a number of spatial layers of the combination of the first codeword and the second codeword that may be the same as provided in a legacy SU-MIMO configuration. In some examples of the method, apparatus, and non-transitory computer-readable medium described above, the third CSI process jointly encodes contains two sets of RI, PMI, and CQI when both the first TP and the second TP may be serving cells, and wherein the DCI comprises a swapping bit that indicates RI, PMI, and CQI for the first codeword and second codeword may be for the second TP and first TP respectively, instead of for the first TP and second TP respectively.

In some examples of the method, apparatus, and non-transitory computer-readable medium described above, the formatting may include rate matching physical downlink shared channel (PDSCH) information around one or more reference signal transmissions from one or more of the first TP or the second TP. In some examples of the method, apparatus, and non-transitory computer-readable medium described above, the PDSCH information may be rate matched around reference signal transmissions of both the first TP and the second TP. In some examples of the method, apparatus, and non-transitory computer-readable medium described above, the PDSCH information transmitted from the first TP may be rate matched around reference signal transmissions of only the first TP.

Some examples of the method, apparatus, and non-transitory computer-readable medium described above may further include processes, features, means, or instructions for determining an energy per resource element (EPRE) for the first portion and the second portion based on a single set of power offset values for both the first TP and the second TP. In some examples of the method, apparatus, and non-transitory computer-readable medium described above, the single set of power offset values correspond to a set of power offset values associated with the first TP or a fixed set of power offset values. Some examples of the method, apparatus, and non-transitory computer-readable medium described above may further include processes, features, means, or instructions for determining a first EPRE for the first portion based on a first set of power offset values for the first TP, and determining a second EPRE for the second portion based on a second set of power offset values for the second TP.

A method of wireless communication is described. The method may include receiving a communication configuration for reception of a first portion of a NCJT from a first TP and a second portion of the NCJT from a second TP and receiving, based at least in part on the communication configuration, the first portion as a first codeword of a SU-MIMO transmission and the second portion as a second codeword of the SU-MIMO transmission.

An apparatus for wireless communication is described. The apparatus may include means for receiving a communication configuration for reception of a first portion of a NCJT from a first TP and a second portion of the NCJT from a second TP and means for receiving, based at least in part on the communication configuration, the first portion as a first codeword of a SU-MIMO transmission and the second portion as a second codeword of the SU-MIMO transmission.

Another apparatus for wireless communication is described. The apparatus may include a processor, memory in electronic communication with the processor, and instructions stored in the memory. The instructions may be operable to cause the processor to receive a communication configuration for reception of a first portion of a NCJT from a first TP and a second portion of the NCJT from a second TP and receive, based at least in part on the communication configuration, the first portion as a first codeword of a SU-MIMO transmission and the second portion as a second codeword of the SU-MIMO transmission.

A non-transitory computer readable medium for wireless communication is described. The non-transitory computer-readable medium may include instructions operable to cause a processor to receive a communication configuration for reception of a first portion of a NCJT from a first TP and a second portion of the NCJT from a second TP and receive, based at least in part on the communication configuration, the first portion as a first codeword of a SU-MIMO transmission and the second portion as a second codeword of the SU-MIMO transmission.

In some examples of the method, apparatus, and non-transitory computer-readable medium described above, the resource blocks for each of the first portion and the second portion may be aligned resource blocks. Some examples of the method, apparatus, and non-transitory computer-readable medium described above may further include processes, features, means, or instructions for receiving, based at least in part on the communication configuration, a transmission from only the first TP, the transmission formatted into two codewords in two spatial layers transmitted from the first TP.

In some examples of the method, apparatus, and non-transitory computer-readable medium described above, the communication configuration may be received in a single DCI transmission. In some examples of the method, apparatus, and non-transitory computer-readable medium described above, the DCI comprises one or more parameters to configure the receiving the NJCT from both the first TP and the second TP, or to configure the receiving of two codewords from the first TP. In some examples of the method, apparatus, and non-transitory computer-readable medium described above, the one or more parameters comprise one or more of an index to a table defining QCL information for each of the first TP and the second TP. In some examples of the method, apparatus, and non-transitory computer-readable medium described above, the DCI comprises a field to indicate the antenna ports, scrambling ID, and number of layers for each of the first codeword and the second codeword.

In some examples of the method, apparatus, and non-transitory computer-readable medium described above, the antenna ports, scrambling ID, and number of layers field, when only the first TP or the second TP may be a serving cell, provides a same structure as a legacy SU-MIMO DCI information, and when both the first TP and the second TP may be serving cells, provides support for any available number of spatial layers for the first codeword and the second codeword. In some examples of the method, apparatus, and non-transitory computer-readable medium described above, the antenna ports, scrambling ID, and number of layers field uses a same format as a same field in a legacy SU-MIMO configuration, and a number of spatial layers of the combination of the first codeword and the second codeword may be the same as provided in the legacy SU-MIMO configuration. In some examples of the method, apparatus, and non-transitory computer-readable medium described above, the antenna ports, scrambling ID, and number of layers field further includes a swapping bit that indicates that the first codeword and second codeword in the antenna ports, scrambling ID, and number of layers field may be for the second TP and first TP respectively, instead of for the first TP and second TP respectively.

Some examples of the method, apparatus, and non-transitory computer-readable medium described above may further include processes, features, means, or instructions for performing, based at least in part on the communication configuration, CSI processes for each of the first TP and the second TP. In some examples of the method, apparatus, and non-transitory computer-readable medium described above, the CSI processes comprise a first CSI process that assumes the first TP may be a serving cell and a second CSI process that assumes the second TP may be the serving cell. In some examples of the method, apparatus, and non-transitory computer-readable medium described above, the CSI processes comprise a first CSI process that assumes the first TP may be a serving cell, a second CSI process that assumes the second TP may be the serving cell, and a third CSI process that that assumes both the first TP and the second TP may be the serving cells. In some examples of the method, apparatus, and non-transitory computer-readable medium described above, the third CSI process bundles a separate CSI process for each of the first TP and the second TP. In some examples of the method, apparatus, and non-transitory computer-readable medium described above, the third CSI process jointly encodes information from separate CSI process for each of the first TP and the second TP.

In some examples of the method, apparatus, and non-transitory computer-readable medium described above, the receiving further comprises receiving a demodulation reference signal (DMRS) in the first portion and the second portion. In some examples of the method, apparatus, and non-transitory computer-readable medium described above, the DMRS may be received according to a pattern that may be determined based on a total rank of a PDSCH transmission of the NCJT. In some examples of the method, apparatus, and non-transitory computer-readable medium described above, a first RI field indicates a DMRS port for the first TP and a second RI field indicates the DMRS port for the second TP.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
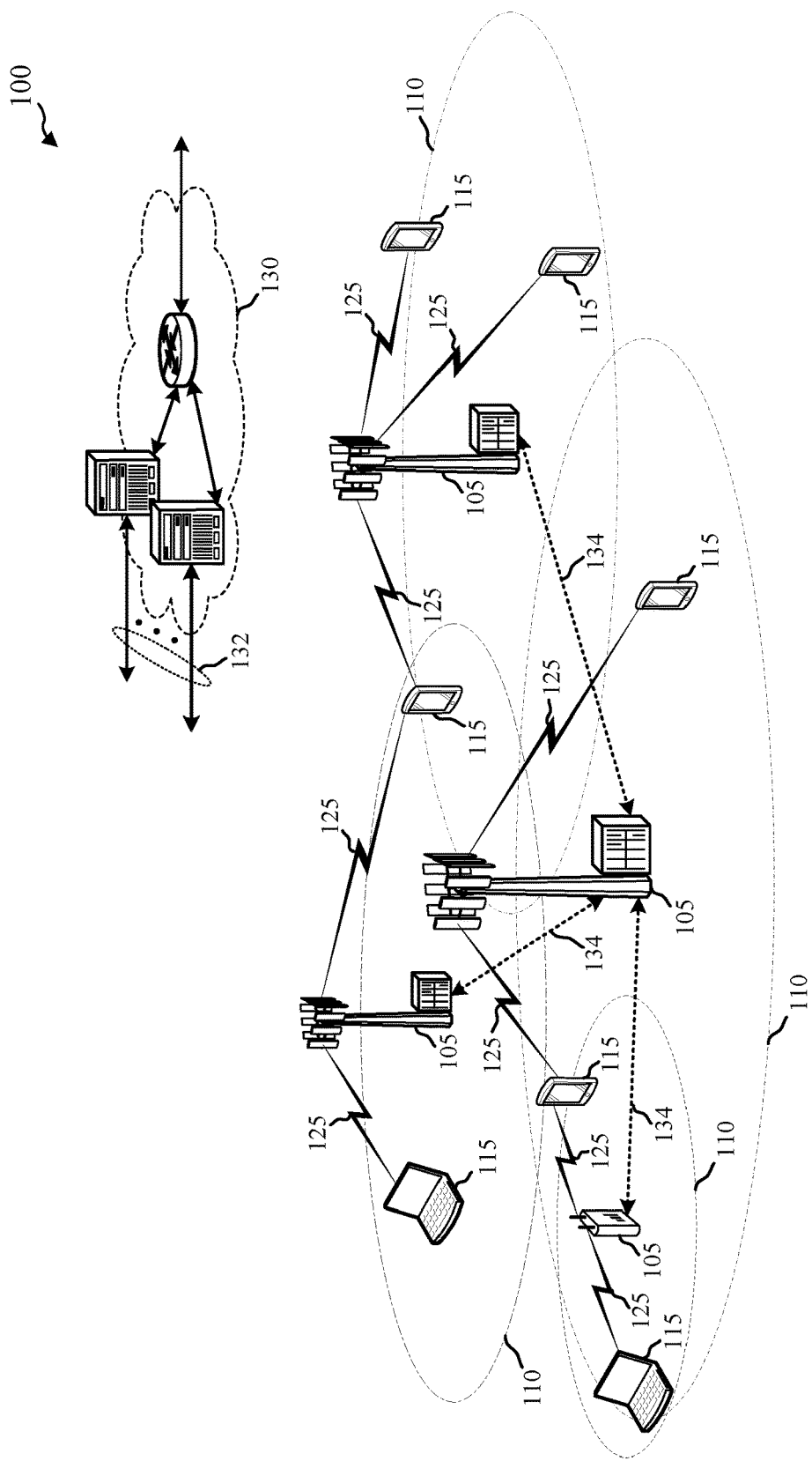
FIG. 1 illustrates an example of a system for wireless communication that supports techniques for non-coherent joint transmissions in wireless communications in accordance with aspects of the present disclosure.

Various aspects of the present disclosure provide for NCJT between base stations or TPs and a UE. Traditionally, some wireless communications systems may use coherent CoMP transmissions in which two or more TPs may transmit data to a UE through several CoMP schemes, including dynamic point selection (DPS) in which different TPs transmit data to a UE at different times, joint transmission (JT) in which two or more TPs contemporaneously transmit data to a UE, and coordinated beamforming (CBF) in which two or more TPs coordinate signal transmissions that reduce interference between the two or more TPs and/or with nodes in adjacent cells. Such traditional CoMP techniques require significant coordination and backhaul communications between cooperating TPs, and may not be available for TPs that have a less than ideal backhaul, which can limit the usefulness of joint transmissions and reduce overall system throughput. NCJT techniques discussed herein may enable joint transmissions in additional situations and may improve the user experience. Various NCJT techniques described herein also have a lower requirement on the backhaul speed between TPs, and may allow transmissions from each TP as independent data streams.

Various examples of NCJT techniques discussed herein provide JTs with a relatively low implementation complexity, which may allow implementation at UEs with relatively few changes. In some examples, one or more TPs may identify portions of a NCJT to be transmitted by different TPs. In some examples, one or more TPs coordinate for NCJT communications, and format a first portion of the NCJT into a first codeword that may be received at the UE as a first codeword of a single-user multiple-input multiple-output (SU-MIMO) transmission and a second portion of the NCJT into a second codeword that may be received at the UE as a second codeword of a SU-MIMO transmission. The UE may thus receive the NCJT from both TPs (or one TP) as different codewords using SU-MIMO demodulation and decoding. In some cases, each TP may communicate with the UE using a different layer, and in other cases each TP may utilize multiple layers to transmit a codeword (or transport block). Resource blocks (RBs) may be allocated in each layer to provide aligned RBs that are received at the UE.

One or more TPs, which may be referred to as base stations interchangeably herein, may configure a UE for NCJT through downlink control information (DCI) provided to the UE. The DCI, in some examples, may include one or more parameters to configure the UE to receive the NCJT from both a first TP and second TP, or to configure the UE to receive two codewords in two spatial layers from either the first TP or the second TP. Channel state information (CSI) processes at the UE may be performed that assume the first TP is a serving cell for the UE, the second TP is a serving cell for the UE, or that both the first and second TP are serving cells for the UE. In some examples, the UE may have one or more additional CSI processes that may provide bundled or jointly encoded CSI information for the TPs. Various examples provide for rate matching around reference signals of one or more TPs, as well as transmit power control (TPC) techniques for NCJTs.

Aspects of the disclosure are initially described in the context of a wireless communication system. Further examples are then provided for wireless communications systems that support codeword-specific NCJT transmissions. Aspects of the disclosure are further illustrated by and described with reference to apparatus diagrams, system diagrams, and flowcharts that relate to enhanced NCJT operation.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may enable efficient NCJTs using SU-MIMO layer-specific and codeword-specific configurations.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications system 100 may employ NCJTs in which two or more TPs may transmit data to a UE 115. A TP may also be referred to as a base station 105 or a wireless node, and the terms may be used interchangeably. Such NCJTs may provide a first transmission from a first TP as a first codeword in a SU-MIMO transmissions, and a second transmission from the first TP or a second TP as a second codeword in a SU-MIMO transmission. A UE 115 may use SU-MIMO techniques to receive the NCJTs from the TPs. Such NCJT techniques may provide for dynamic coordination of transmission and reception by a number of base stations 105 to improve overall transmission quality for UEs 115 as well as to increase network and spectrum utilization.

Base stations 105 and UEs 115 may use multiple-input multiple-output (MIMO) techniques, where multiple transmit and receive antennas are used to transmit and receive signals, respectively. MIMO techniques use multiple antennas on the base stations 105 or multiple antennas on the UE 115 to take advantage of multipath environments to transmit multiple data streams. A UE 115 may report channel information (e.g., CSI) to the base station 105 regarding the quality of the signal received at each antenna. The base station 105 may accordingly use a rank indicator (RI) that is based on an antenna configuration associated with the number of antennas used.

When transmitting a signal, the base station 105 may convert a bit sequence of a codeword into modulation symbols and assign the modulation symbols to one or more transmission layers. The number of transmission layers may be associated with the number of antennas used for communication between the base station 105 and UE 115. For example, the number of layers may be less than or equal to the number of antennas, and a MIMO configuration may use at least two layers. While the techniques described herein reference the use and transmission of codewords, a codeword may also be referred to as a transport block (TB) and the terms may be interchangeable.

In some cases, MIMO transmissions may use a designated number of codewords that are associated with the number of layers. For example, two codewords may be used for transmissions of up to eight layers, such as a rank 8 transmission. In such cases, each codeword in the rank 8 transmission may include four layers. Each codeword may have a different modulation and coding scheme (MCS), new data indicator (NDI), and redundancy version (RV), but different layers corresponding to the same codeword may have the same MCS, NDI, and/or RV. Similarly, hybrid automatic repeat request (HARQ) feedback may also be transmitted on a per-codeword basis (e.g., as opposed to a per-layer basis). SU-MIMO refers to MIMO techniques for a single UE 115 receiver as opposed to MIMO techniques that provide concurrent transmissions to multiple UEs 115.

In some cases, base station antennas may be located within one or more antenna arrays. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

As described herein, a UE 115 may use SU-MIMO layer-specific and codeword-specific communication configurations to communicate with at least one base station 105. For example, multiple base stations 105 may be configured to provide NCJTs to a UE 115. The base stations 105 may transmit a set of communication configurations to the UE 115 that include at least one SU-MIMO layer-specific or codeword-specific configuration. The UE 115 may also receive an indication of at least one communication configuration that may be used to perform SU-MIMO layer-specific or codeword-specific channel operations. The UE 115 may then communicate with the base stations 105 using the communication configurations.

Figure 2:
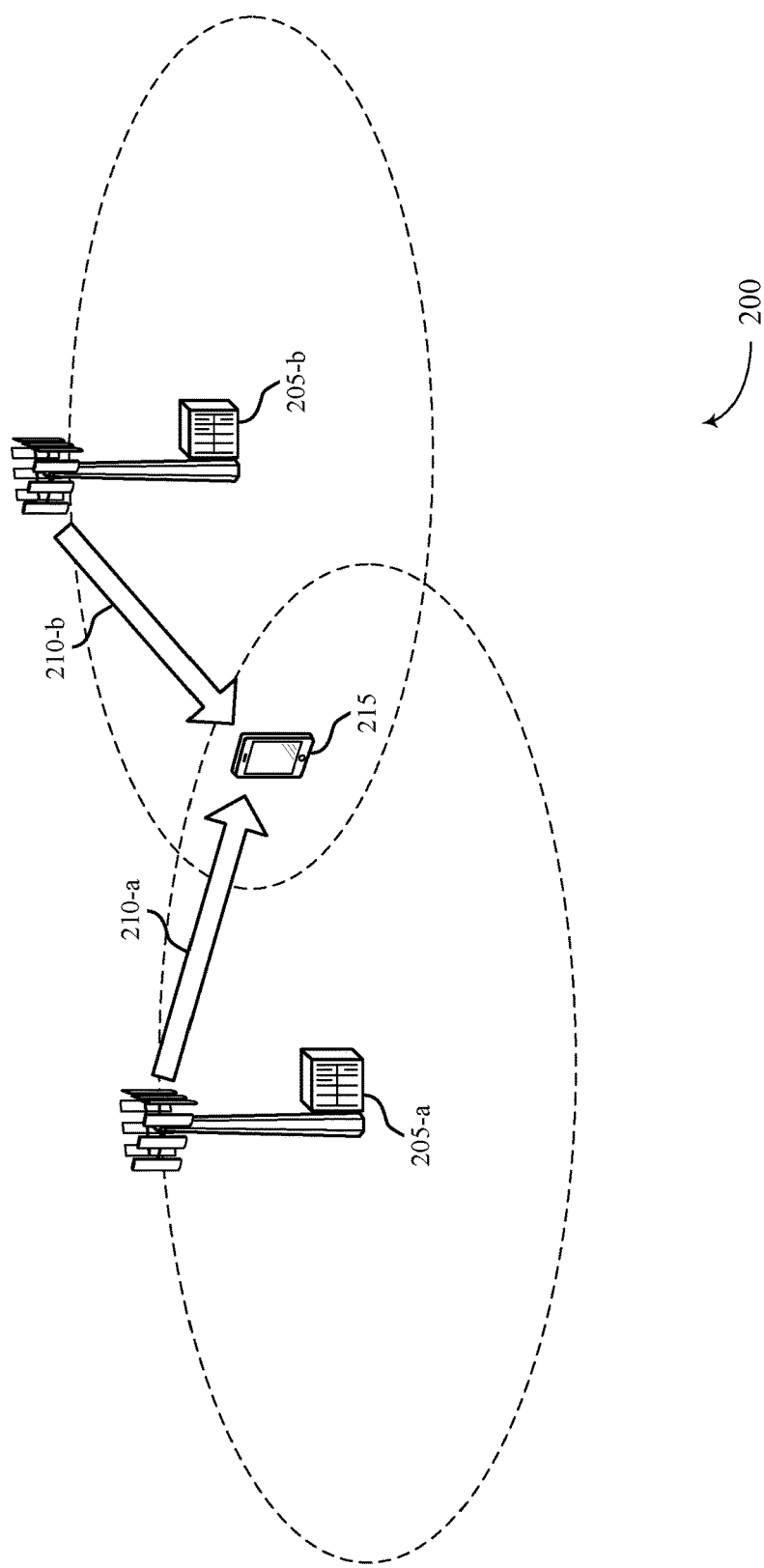
FIGS. 2 through 5 illustrate examples of wireless communications systems that support techniques for non-coherent joint transmissions in wireless communications in accordance with aspects of the present disclosure.

FIG. 2 illustrates an example of a wireless communications system 200 for NCJT operation. Wireless communications system 200 may include base station 205-a, base station 205-b, and UE 215, which may be examples of the corresponding devices described with reference to FIG. 1. Wireless communications system 200 may illustrate an example of SU-MIMO layer-specific NCJTs where each base station 205 transmits one or more codewords, each codeword associated with one or more SU-MIMO layers.

Wireless communications system 200 may use a communication configuration that includes a SU-MIMO layer-specific configuration. That is, UE 215 may receive a set of communication configurations that includes a SU-MIMO layer-specific configuration. The SU-MIMO layer-specific configuration may include transmitting different sets of layers from different TPs or base stations 205, such as base station 205-a and/or base station 205-b. For example, base station 205-a may transmit a first codeword on a first layer 210-a to UE 215 and base station 205-b may transmit a second codeword on a second layer 210-b to UE 215. The first layer 210-a and second layer 210-b may comprise a complete transmission to UE 215 in accordance with NCJT techniques described above.

Figure 3:
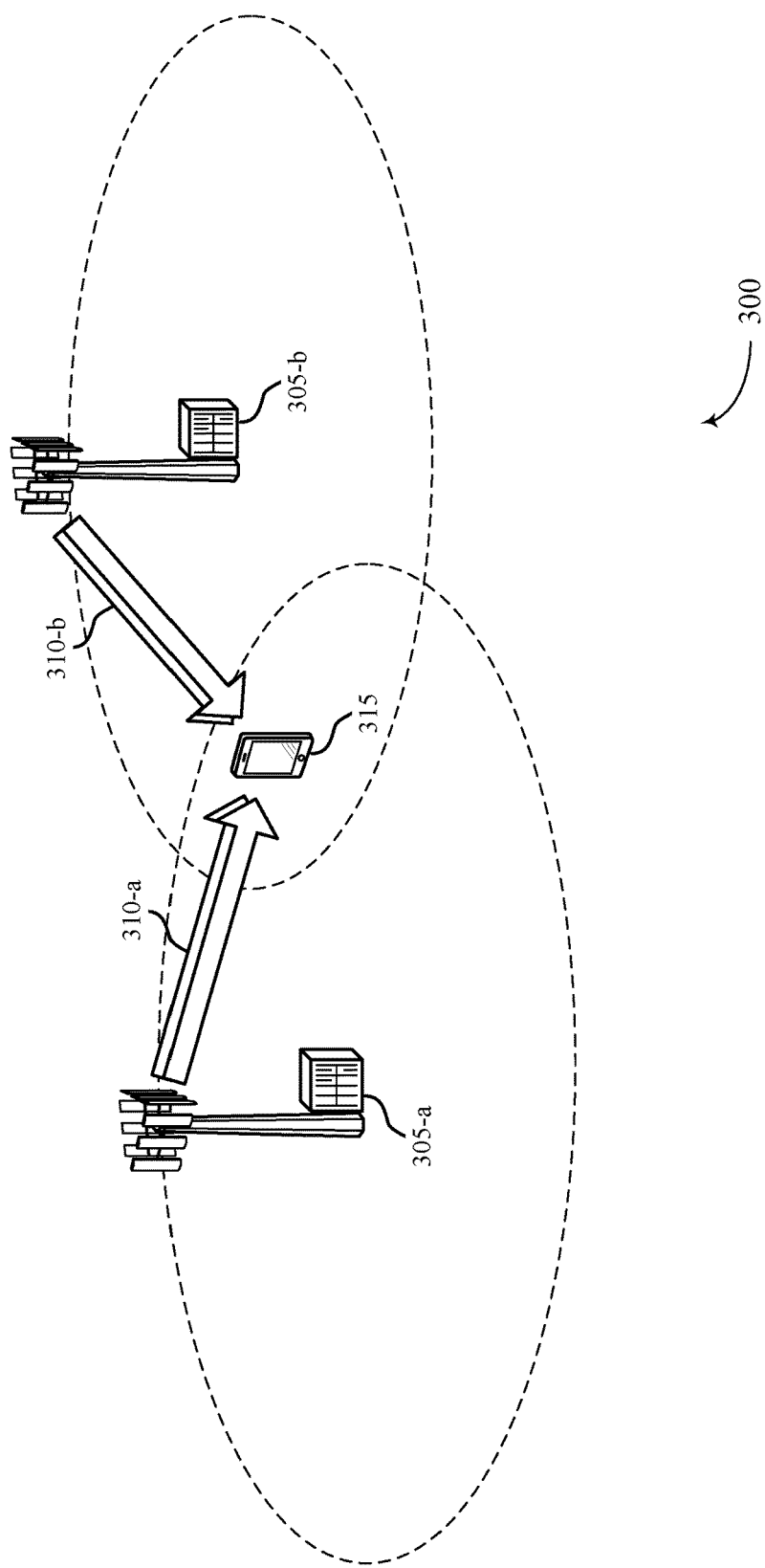

In some examples, TPs may transmit a codeword on more than one layer. FIG. 3 illustrates an example of a wireless communications system 300 for NCJT operation in which codewords are transmitted using multiple layers. Wireless communications system 300 may include base station 305-a, base station 305-b, and UE 315, which may be examples of the corresponding devices described with reference to FIGS.

1 and 2. Wireless communications system 300 may illustrate an example of SU-MIMO layer-specific NCJTs where each base station 305 transmits a codeword that is associated with two SU-MIMO layers.

In this example, the SU-MIMO layer-specific configuration may include two layers for each codeword from different TPs. Base station 305-a may transmit a first codeword on two layers 310-a to UE 315, and base station 305-b may transmit a second codeword on two layers 310-b to UE 215. The first codeword on the two layers 310-a and the second codeword on the two layers 310-b may comprise a complete transmission to UE 315 in accordance with NCJT techniques described above. The number of layers 310 used for a codeword transmission may depend on a configuration associated with the number of antennas used by base station 305-a or base station 305-b to communicate with UE 315 (e.g., more than two layers may be used).

Figure 4:
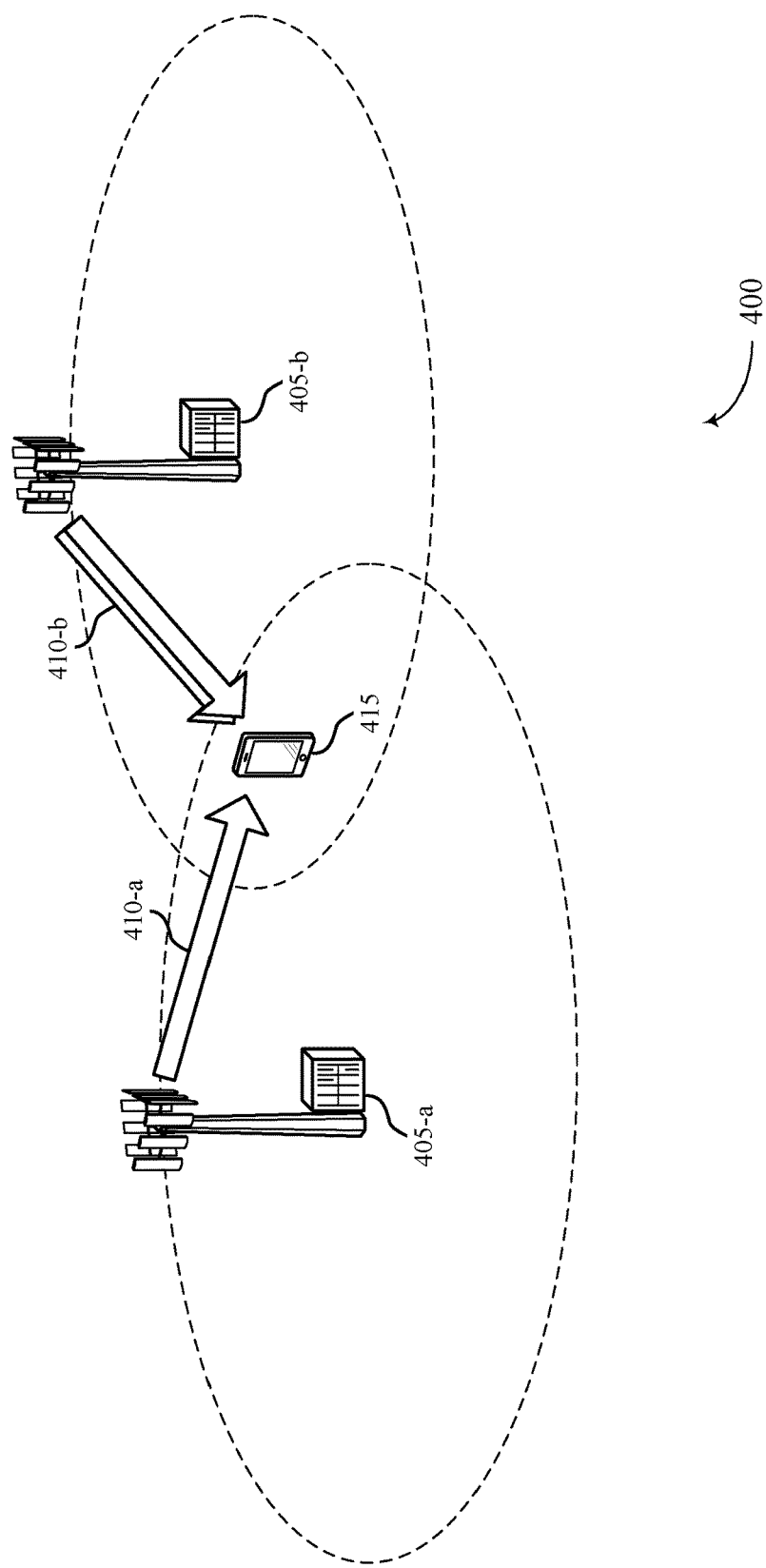

In some examples, different TPs may transmit a codeword on different numbers of layers. FIG. 4 illustrates an example of a wireless communications system 400 for NCJT operation in which codewords are transmitted using a different number of layers from different TPs 405. Wireless communications system 400 may include base station 405-a, base station 405-b, and UE 415, which may be examples of the corresponding devices described with reference to FIGS. 1-3. Wireless communications system 400 may illustrate an example of SU-MIMO layer-specific NCJTs where each base station 405 transmits a codeword that is associated with a different number of SU-MIMO layers.

In this example, the SU-MIMO layer-specific configuration may include a first codeword transmitted in a single layer 410-a from first base station 405-a and a second codeword transmitted in two layers 410-b from the second base statin 405-b. The number of layers 410 used for a codeword transmission may depend on a configuration associated with the number of antennas used by base station 405-a or base station 405-b to communicate with UE 415. While FIGS. 2-4 illustrate examples that use one or two layers for transmission, various examples provide that any combination of layers, or rank combination, may be used for the different TPs 405. In some examples, NCJTs may be transmitted using any combination of layers from different TPs 405, and a separate RI may be provided for each TP. In other examples, rank combinations as provided in legacy CoMP techniques may be used in which a rank combination between the two codewords are either the same or differ by one. In some examples (e.g., when the rank differs) the first TP may have a lower rank than the second TP. In some examples, legacy rank combinations may be used, but the first codeword may have a higher rank than the second codeword. Such combinations may be provided by using an extended RI that allows the additional rank combinations, or through the use of a swapping bit in the DCI that indicates codeword ranks of a legacy RI are to be swapped (e.g., RI indicates R1 and R2 for the first and second codewords, and the swapping bit indicates whether or not to swap the ranks).

Figure 5:
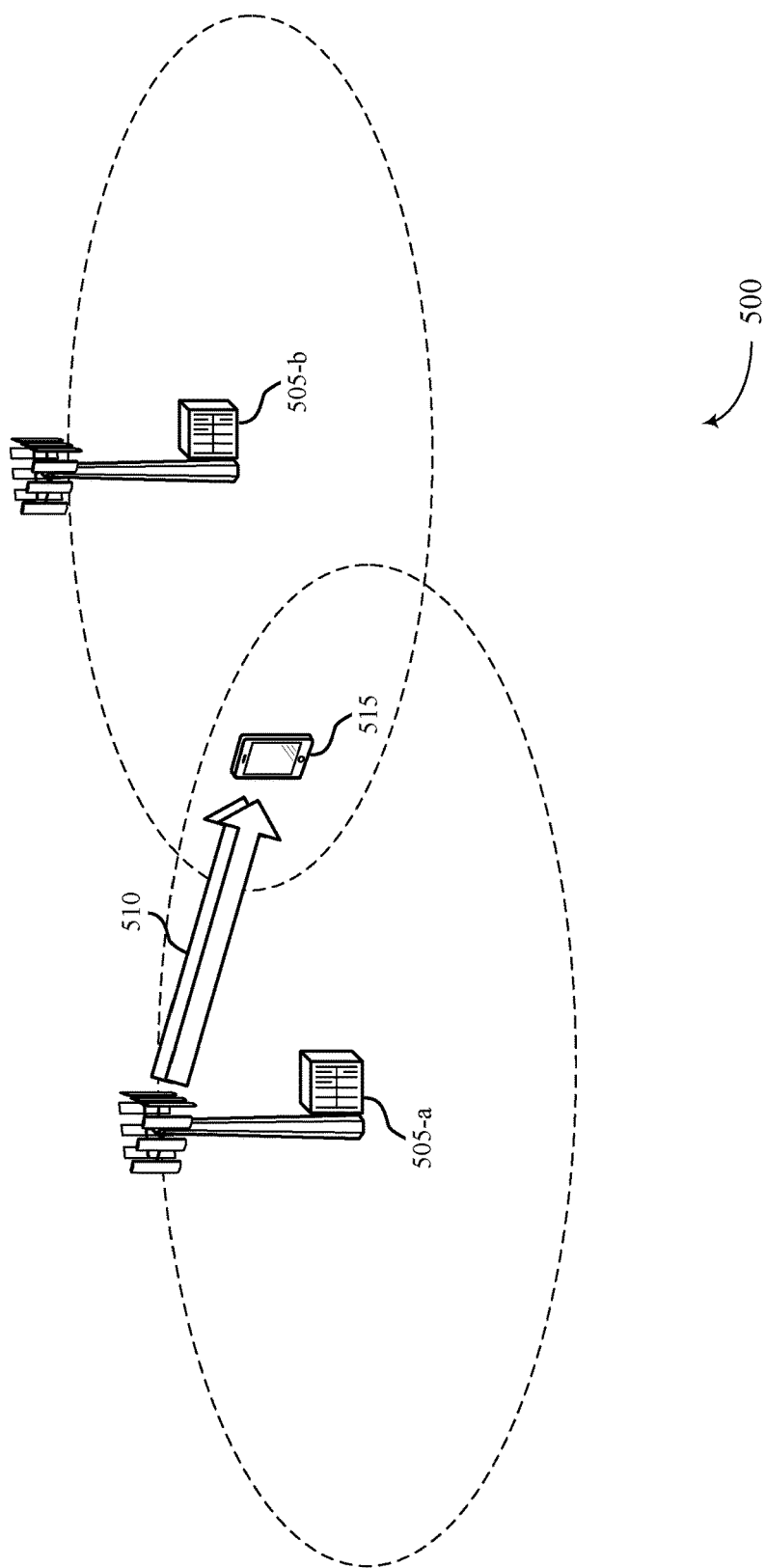

In some examples, different TPs may be configured for NCJT, but only one TP may transmit. FIG. 5 illustrates an example of a wireless communications system 500 for NCJT operation in which one TP transmits two codewords using different layers. Wireless communications system 500 may include base station 505-a, base station 505-b, and UE 515, which may be examples of the corresponding devices described with reference to FIGS. 1-4. Wireless communications system 500 may illustrate an example of SU-MIMO layer-specific NCJTs where first base station 505-a transmits two codewords using SU-MIMO layers 510, and second base station 505-b does not transmit. Selecting a transmission to be transmitted by one or more TPs may provide additional flexibility, and may also allow transmission of both codewords from a single TP (e.g., in cases where RBs from different TPs would not be aligned).

Techniques discussed with respect to FIGS. 2-5 may provide that when two separate data streams are served from the two TPs, the two TPs only coordinate on the scheduling activity (e.g., but may not need to coordinate joint encoding and/or precoding). In some examples, the RB allocations for each TP are aligned and a single DCI transmission may be used to grant physical downlink shared channel (PDSCH) resources from both TPs. The single DCI may also be used to grant PDSCH resources when only one of the TPs is transmitting. The NCJTs from the different TPs, in some examples, may use only demodulation reference signal (DMRS) transmission modes.

UEs discussed above may report CSI feedback to base stations regarding the quality of the signals received based on the communication configuration. In some examples, UEs may maintain the two separate CSI processes, and each CSI process may assume one of the base stations is the serving base station. In some examples, additional CSI processes may be added e.g., in which both base stations are assumed to be serving base stations. In some examples, the additional CSI processes may be bundled and reported as one CSI process. Each CSI process may contain a RI, precoding matrix indicator (PMI), and channel quality indicator (CQI) for each base station under the NCJT operation. In some cases, a RI restriction may be provided to cover a maximum total rank of the combined ranks of each codeword. In some examples, the additional CSI processes may be jointly encoded. In some cases, the additional CSI process may provide the PMI/RI/CQI for both TPs for NCJT.

In some cases, the TPs of a NCJT communication may include one or more reference signals in their transmissions, such as a cell-specific reference signal (CRS) or a channel state information-reference signal (CSI-RS). In some examples, PDSCH transmissions of each TP may rate match around the reference signal transmissions of both of the TPs. In other examples, PDSCH transmissions of a TP may be rate matched around only reference signals of the TP irrespective of reference signal transmissions of the other TP, which may simplify coordination between TPs of a NCJT. For example, in some cases each TP may rate match PDSCH transmissions around its own CRS and around the CSI-RS of both TPs (e.g., which may provide better CSI-RS channel estimation quality because of the blanking of the other TP).

Additionally, as discussed above, the NCJTs of various examples may use DMRS transmission modes. In such cases, DMRS transmissions are provided according to an established DMRS pattern that may be determined based in part on a rank of a transmission. In some examples, the DMRS pattern of each codeword of a NCJT follows the total combined rank of the PDSCH transmission. In some cases, when a DMRS is transmitted, if a first TP gets $R_1$ ports and a second TP gets $R_2$ ports, the total rank of the NCJT is $R=R_1+R_2$, and the UE may determine the $R_1$, $R_2$, and R information from the DCI. For DMRS transmissions, the first TP may transmit on the first $R_1$ antenna ports, and the second TP may transmit on the next $R_2$ antenna ports. For example, if the first TP is rank 3 and the second TP is rank 2, the first TP may transmit over antenna ports 7, 8, and 9 while the second TP may transmit over antenna ports 10 and 11. In some examples, a DMRS transmission scheme (e.g., CDM2 or CDM4) may be radio resource control (RRC) configured during a connection establishment between the UE and TPs.

A power at which the PDSCH transmissions may be transmitted from each TP may be determined according to TPC techniques. In some examples, each TP may determine an energy per resource element (EPRE) for the NCJT codeword transmissions using a single set of power offsets (e.g., power offsets $P_A$ and $P_B$ of established TPC techniques). The single set of power offsets may be, for example, the power offsets associated with one of the TPs, or may be a fixed value that is pre-established and signaled to each TP. In other examples, each TP may use different power offsets associated with the particular TP.

Figure 6:
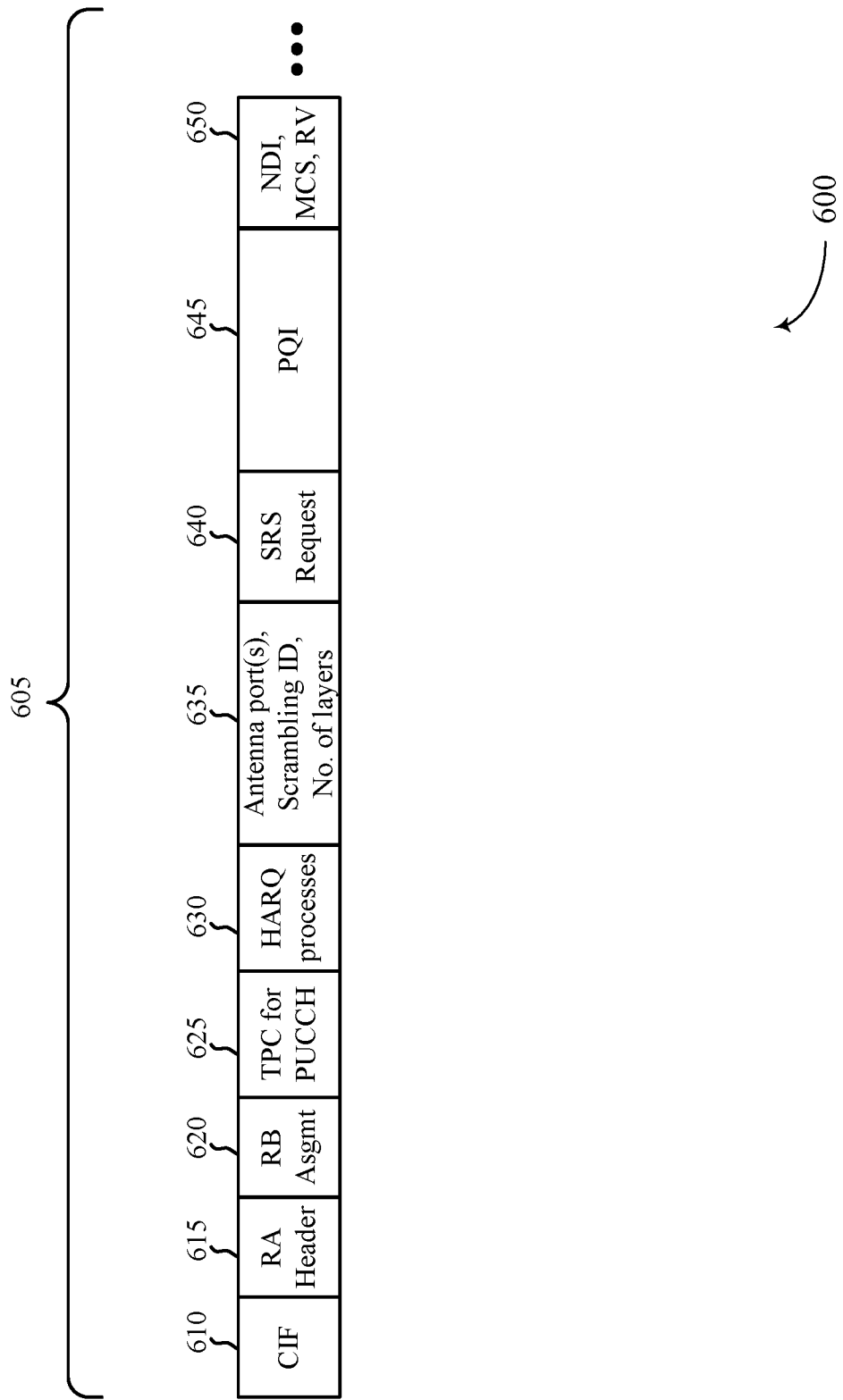
FIG. 6 illustrates an example of downlink control information that supports techniques for non-coherent joint transmissions in wireless communications in accordance with aspects of the present disclosure.

FIG. 6 illustrates an example of a DCI 600 for configuring NCJTs in wireless communications. The DCI 600 of FIG. 6 may be used by base stations and UEs of FIGS. 1-5 to configure the UEs to receive NCJTs. The DCI 600 may include a number of DCI fields 605, including a carrier indicator field (CIF) 610, a resource allocation header 615, a resource block assignment 620, a TPC command for a physical uplink control channel (PUCCH) transmission 625, and a HARQ process number 630, which may each correspond to fields according to established DCI format 2D of legacy LTE systems.

The DCI fields 605 may also include an antenna port(s), scrambling ID, and number of layers field 635, which may be modified to provide information for a first TP and a second TP of a NCJT. In some examples, when only the first TP or the second TP is a serving cell, the antenna port(s), scrambling ID, and number of layers field 635 provides a same structure as in legacy SU-MIMO DCI information. In some cases, when both the first TP and the second TP are serving cells, the antenna port(s), scrambling ID, and number of layers field 635 provides support for any available number of spatial layers for the first codeword and the second codeword. In some examples, the number of spatial layers of the combination of the first codeword and the second codeword are the same as provided in legacy SU-MIMO configurations. The antenna port(s), scrambling ID, and number of layers field 635, in some examples, may also include a swapping bit that indicates that the first codeword and second codeword in the antenna port(s), scrambling ID, and number of layers field 635 are for the second TP and first TP respectively, instead of for the first TP and second TP, respectively.

The DCI fields 605 may also include a sounding reference signal (SRS) request field 640, that may operate in a similar manner as in legacy configurations. A PDSCH RE mapping and quasi-co-location (QCL) indicator (PQI) field 645 may provide RE mapping and QCL information for each codeword. In legacy PQI fields, there is a single 2-bit PQI as an index to a table defining QCL information. In some examples, the PQI field 645 of the present disclosure may provide QCL for both TPs. Additionally, the PQI field 645 may provide relevant QCL information if only one TP is participating. In some examples, a single 4-bit PQI field may be used to jointly encode the two TP QCL indicators, thus providing 16 possible combinations. In other examples, two 2-bit PQI fields specify the QCL for the two TPs separately, with each PQI field having one combination to indicate that a TP is not transmitting. A 4-bit joint PQI table is provided in Table 1 below, and the PQI field 645 may provide an index into the table. A two 2-bit PQI design is provided in Table 2 below, and the PQI field 645 may provide an index into the table.

TABLE 1

Example 4-bit Joint PQI Field Design

| PQI value | Description |
|---|---|
| '0000'-'0011' | Parameter sets 1 to 4 configured by higher layers, with TP1 transmitting only |
| '0100'-'0111' | Parameter sets 5 to 8 configured by higher layers, with TP2 transmitting only |
| '1000'-'1111' | Parameter sets 9 to 16 configured by higher layers, with both TPs transmitting |

TABLE 2

Example Two 2-bit PQI Field Design

| PQI1 value | PQI2 value | Description |
|---|---|---|
| '00' | | TP1 not participating in NCJT |
| '01'-'11' | | Parameter sets 1 to 3 for TP1 configured by higher layers |
| | '00' | TP2 not participating in NCJT |
| | '01'-'11' | Parameter sets 1 to 3 for TP2 configured by higher layers |
| '00' | '00' | Reserved |

The DCI fields 605 of this example may also include NDI, MCS, and RV field 650, which may be configured as in legacy systems. The DCI 600 may be transmitted to a UE by one or more of the TPs, and the UE may receive the DCI and determine a communication configuration for receiving the NCJT from the TPs.

Figure 7:
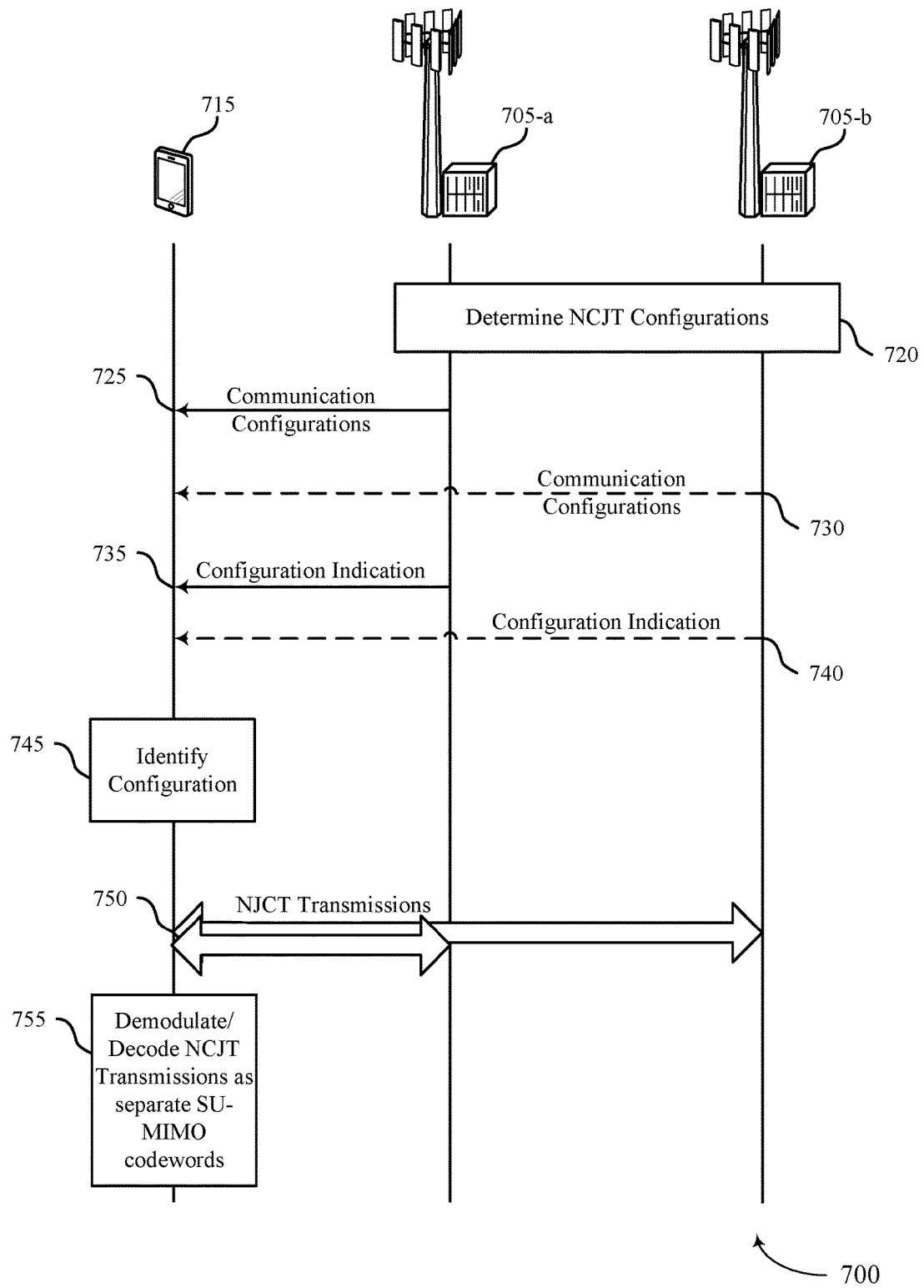
FIG. 7 illustrates an example of a process flow that supports techniques for non-coherent joint transmissions in wireless communications in accordance with aspects of the present disclosure.

FIG. 7 illustrates an example of a process flow 700 for NCJT communications in accordance with various aspects of the present disclosure. Process flow 700 may include a first base station 705-a, a second base station 705-b, and UE 715, which may be examples of the corresponding devices described with reference to FIGS. 1-6.

At block 720, one or more base stations 705 may determine a set of NCJT configurations for transmissions to UE 715, where at least one of the set of communication configurations is based on a SU-MIMO layer-specific communication or a codeword-specific communication. The determination of the NCJT configurations may be completed by first base station 705-a, or second base station 705-b, or both, and the base stations 705 may coordinate using backhaul communications. The first base station 705-a may communicate configurations 725 to the UE 715. Additionally or alternatively, the second base station 705-b may communicate configurations 730 to the UE 715. The communication of configurations may be provided, in some examples, during a connection establishment with the UE 715 and may provide one or more available configurations for communications, including NCJT communications in which the first base station 705-a may transmit a first codeword on one or more layers, and the second base station 705-b may transmit a second codeword on one or more layers.

A configuration indication 735 may be transmitted by the first base station 705-a to the UE 715 that may indicate NCJT for a PDSCH transmission. Additionally or alternatively, the second base station 705-b may transmit a configuration indication 740 that may indicate NCJT for the PDSCH transmission. The configuration indication 735 or 740 may provide DCI that is transmitted to the UE 715. In some cases, the DCI may be communicated in a single DCI transmission.

At block 745, the UE 715 may identify the configuration for the PDSCH transmission as a NCJT communication from one or more base stations 705. The UE 715 may, for example, identify one or more spatial layers for a first codeword to be transmitted by the first base station 705-a and one or more spatial layers for a second codeword to be transmitted by the second base station 705-b, based on the DCI. The first base station 705-a and second base station 705-b may transmit NCJTs 750 to the UE 715 that the UE 715 may receive as codewords in a SU-MIMO transmission. At block 755, the UE 715 may demodulate and decode the NCJTs as separate codewords of a SU-MIMO transmission.

Figure 8:
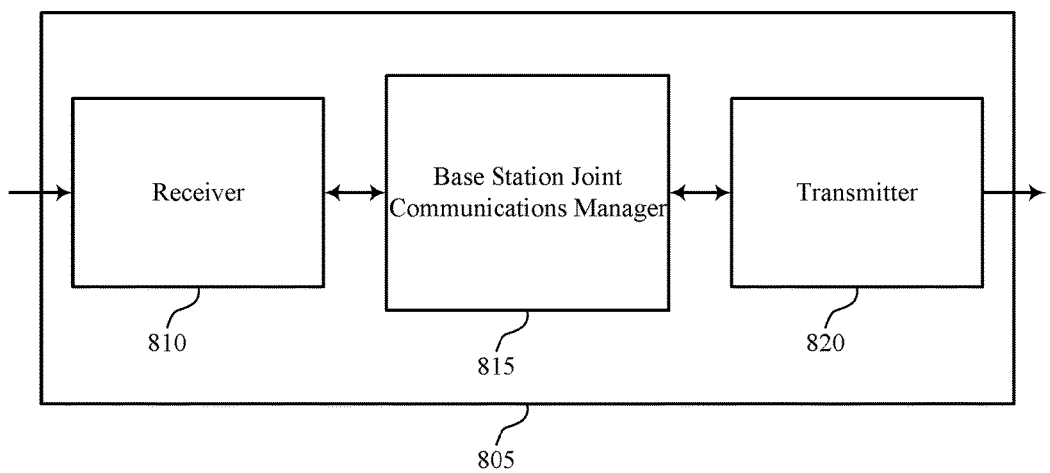
FIGS. 8 through 10 show block diagrams of a device that supports techniques for non-coherent joint transmissions in wireless communications in accordance with aspects of the present disclosure.

FIG. 8 shows a block diagram 800 of a wireless device 805 that supports techniques for NCJTs in wireless communications in accordance with various aspects of the present disclosure. Wireless device 805 may be an example of aspects of a base station as described with reference to FIGS. 1-7. Wireless device 805 may include receiver 810, base station joint communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques for non-coherent joint transmissions in wireless communications, etc.). Information may be passed on to other components of the device. The receiver 810 may be an example of aspects of the transceiver 1135 described with reference to FIG. 11.

Base station joint communications manager 815 may be an example of aspects of the base station joint communications manager 1115 described with reference to FIG. 11. Base station joint communications manager 815 may identify a first portion of a NCJT for transmission from a first TP to a UE and a second portion of the NCJT for transmission from the first TP or a second TP to the UE and format the first portion into a first codeword that may be received at the UE as a first codeword of a SU-MIMO transmission and the second portion into a second codeword that may be received at the UE as a second codeword of a SU-MIMO transmission.

Transmitter 820 may transmit signals generated by other components of the device (e.g., may transmit the first portion or the second portion to the UE). In some examples, the transmitter 820 may be collocated with a receiver 810 in a transceiver module. For example, the transmitter 820 may be an example of aspects of the transceiver 1135 described with reference to FIG. 11. The transmitter 820 may include a single antenna, or it may include a set of antennas.

Figure 9:
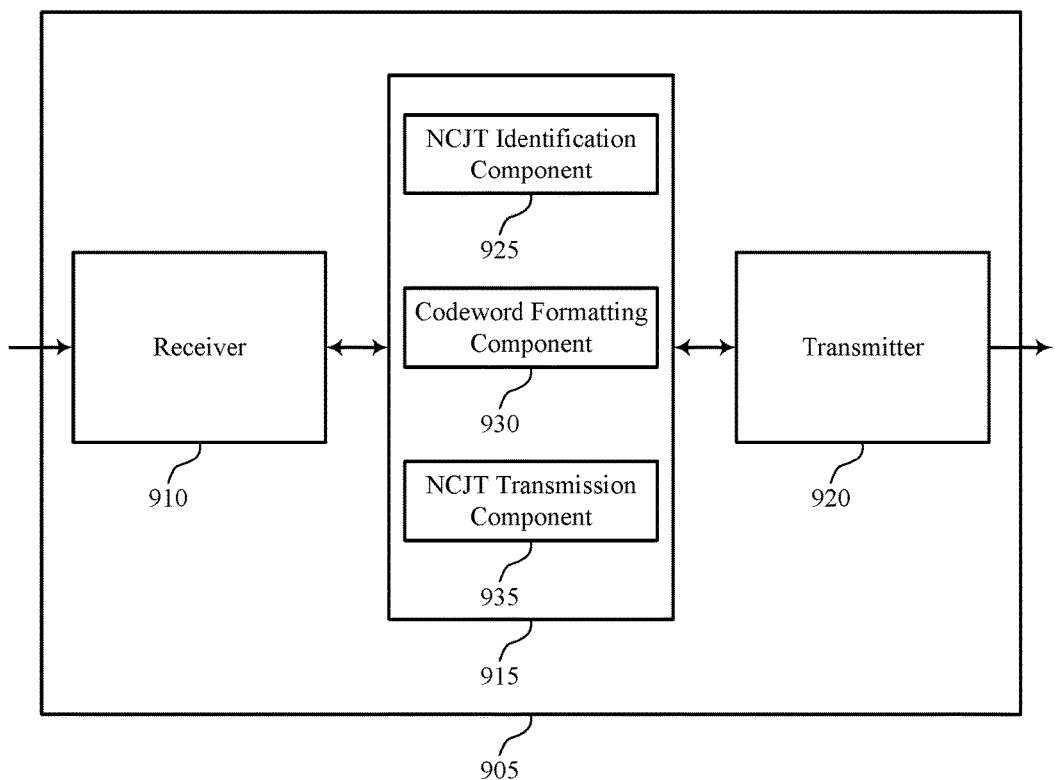

FIG. 9 shows a block diagram 900 of a wireless device 905 that supports techniques for NCJTs in wireless communications in accordance with various aspects of the present disclosure. Wireless device 905 may be an example of aspects of a wireless device 805 or a base station as described with reference to FIGS. 1-7. Wireless device 905 may include receiver 910, base station joint communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for NCJTs in wireless communications, etc.). Information may be passed on to other components of the device. The receiver 910 may be an example of aspects of the transceiver 1135 described with reference to FIG. 11.

Base station joint communications manager 915 may be an example of aspects of the base station joint communications manager 1115 described with reference to FIG. 11. Base station joint communications manager 915 may also include NCJT identification component 925, codeword formatting component 930, and NCJT transmission component 935.

NCJT identification component 925 may identify a first portion of a NCJT for transmission from a first TP to a UE, and a second portion of the NCJT for transmission from the first TP or a second TP to the UE. Codeword formatting component 930 may format the first portion into a first codeword that may be received at the UE as a first codeword of a SU-MIMO transmission and the second portion into a second codeword that may be received at the UE as a second codeword of a SU-MIMO transmission. NCJT transmission component 935 may coordinate transmission of the first portion or the second portion to the UE or coordinate a transmission from only the first TP, the transmission formatted into two codewords in two spatial layers transmitted from the first TP.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may include a single antenna, or it may include a set of antennas.

Figure 10:
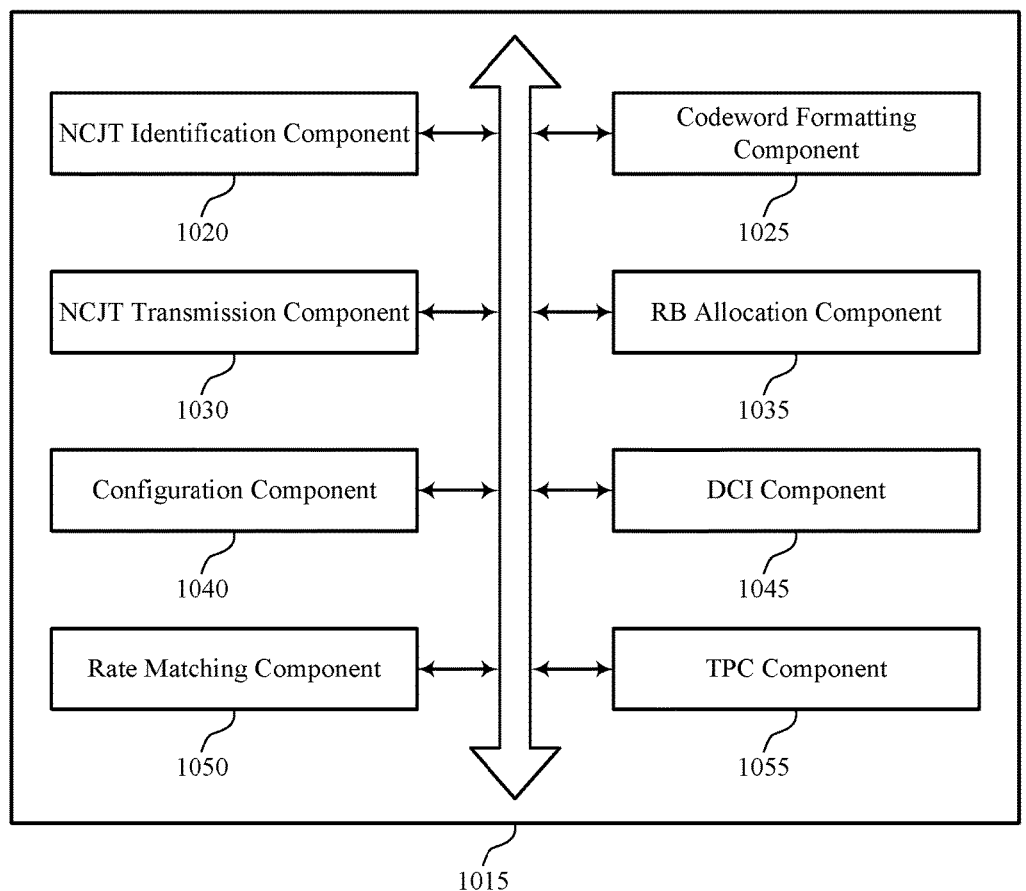

FIG. 10 shows a block diagram 1000 of a base station joint communications manager 1015 that supports techniques for NCJTs in wireless communications in accordance with various aspects of the present disclosure. The base station joint communications manager 1015 may be an example of aspects of a base station joint communications manager 815, a base station joint communications manager 915, or a base station joint communications manager 1115 described with reference to FIGS. 8, 9, and 11, respectively. The base station joint communications manager 1015 may include NCJT identification component 1020, codeword formatting component 1025, NCJT transmission component 1030, RB allocation component 1035, configuration component 1040, DCI component 1045, rate matching component 1050, and TPC component 1055. Each of these modules may communicate, directly or indirectly, with one another (e.g., via one or more buses).

NCJT identification component 1020 may identify a first portion of a NCJT for transmission from a first TP to a UE, and a second portion of the NCJT for transmission from the first TP or a second TP to the UE. Codeword formatting component 1025 may format the first portion into a first codeword that may be received at the UE as a first codeword of a SU-MIMO transmission and/or the second portion into a second codeword that may be received at the UE as a second codeword of a SU-MIMO transmission.

NCJT transmission component 1030 may coordinate transmission of the first portion or the second portion to the UE and/or coordinate a transmission from only the first TP, the transmission formatted into two codewords in two spatial layers transmitted. RB allocation component 1035 may allocate resource blocks for each of the first portion and the second portion to provide aligned RBs at the UE.

Configuration component 1040 may configure the UE to receive the NCJT in a single DCI transmission and configure the UE to perform CSI processes for each of the first TP and the second TP. In some cases, the CSI processes include a first CSI process that assumes the first TP is a serving cell for the UE and a second CSI process that assumes the second TP is the serving cell for the UE. In some cases, a third CSI process assumes both the first TP and the second TP are the serving cells for the UE. In some cases, the third CSI process bundles a separate CSI process for each of the first TP and the second TP. In some cases, a third CSI process jointly encodes two sets of RI, PMI, and CQI when both the first TP and the second TP are serving cells. In some cases, the first CSI process and second CSI process each contain a RI, PMI, and a CQI for the first TP and the second TP, respectively. In some cases, the RI in the CSI processes is restricted to cover a maximum total rank. In some cases, the third CSI process contains two sets of RI, PMI, and CQI when both the first TP and the second TP are serving cells, and provides support for any available number of spatial layers for the first codeword and the second codeword. In some cases, the third CSI process jointly encodes contains two sets of RI, PMI, and CQI when both the first TP and the second TP are serving cells, and provides support for a number of spatial layers of the combination of the first codeword and the second codeword that is the same as provided in a legacy SU-MIMO configuration.

In some cases, configuration component 1040 may coordinated with DCI component 1045 to provide one or more DCI fields that support NCJT communications. In some examples, the DCI includes a swapping bit that indicates RI, PMI, and CQI for the first codeword and second codeword are for the second TP and first TP, respectively, instead of for the first TP and second TP, respectively.

DCI component 1045 may determine one or more parameters to configure the UE to receive the NCJT from both the first TP and the second TP, or to configure the UE to receive two codewords in two spatial layers from either the first TP or the second TP. In some cases, the one or more parameters include one or more indices to a table defining QCL information for each of the first TP and the second TP. In some cases, the index includes a set of bits of information to indicate a combination of QCL information in the table. In some cases, the different combinations in the table indicate whether the UE is to receive the NCJT from both the first TP and the second TP, or the UE is to receive from only one of the first TP or the second TP. In some cases, the set of bits of information jointly encode the QCL for both the first TP and the second TP. In some cases, the set of bits of information include two fields that separately specify the QCL for the first TP and the second TP. In some cases, the DCI includes a field to indicate the antenna ports, scrambling ID, and number of layers for each of the first codeword and the second codeword. In some cases, the antenna port(s), scrambling ID, and number of layers field, when only the first TP or the second TP is a serving cell, provides a same structure as a legacy SU-MIMO DCI information, and when both the first TP and the second TP are serving cells, provides support for any available number of spatial layers for the first codeword and the second codeword. In some cases, the antenna port(s), scrambling ID, and number of layers field uses a same format as a same field in a legacy SU-MIMO configuration, and a number of spatial layers of the combination of the first codeword and the second codeword are the same as provided in the legacy SU-MIMO configuration. In some cases, the antenna port(s), scrambling ID, and number of layers field further includes a swapping bit that indicates that the first codeword and second codeword in the antenna ports, scrambling ID, and number of layers field are for the second TP and first TP, respectively, instead of for the first TP and second TP, respectively.

Rate matching component 1050 may provide rate matching of PDSCH information around one or more reference signal transmissions from one or more of the first TP or the second TP. In some cases, the PDSCH information is rate matched around reference signal transmissions of both the first TP and the second TP. In some cases, the PDSCH information transmitted from the first TP is rate matched around reference signal transmissions of only the first TP.

TPC component 1055 may determine an EPRE for the first portion and the second portion based on a single set of power offset values for both the first TP and the second TP. In some cases, the TPC component 1055 may determine a first EPRE for the first portion based on a first set of power offset values for the first TP, and determine a second EPRE for the second portion based on a second set of power offset values for the second TP. In some cases, the single set of power offset values correspond to a set of power offset values associated with the first TP or a fixed set of power offset values.

Figure 11:
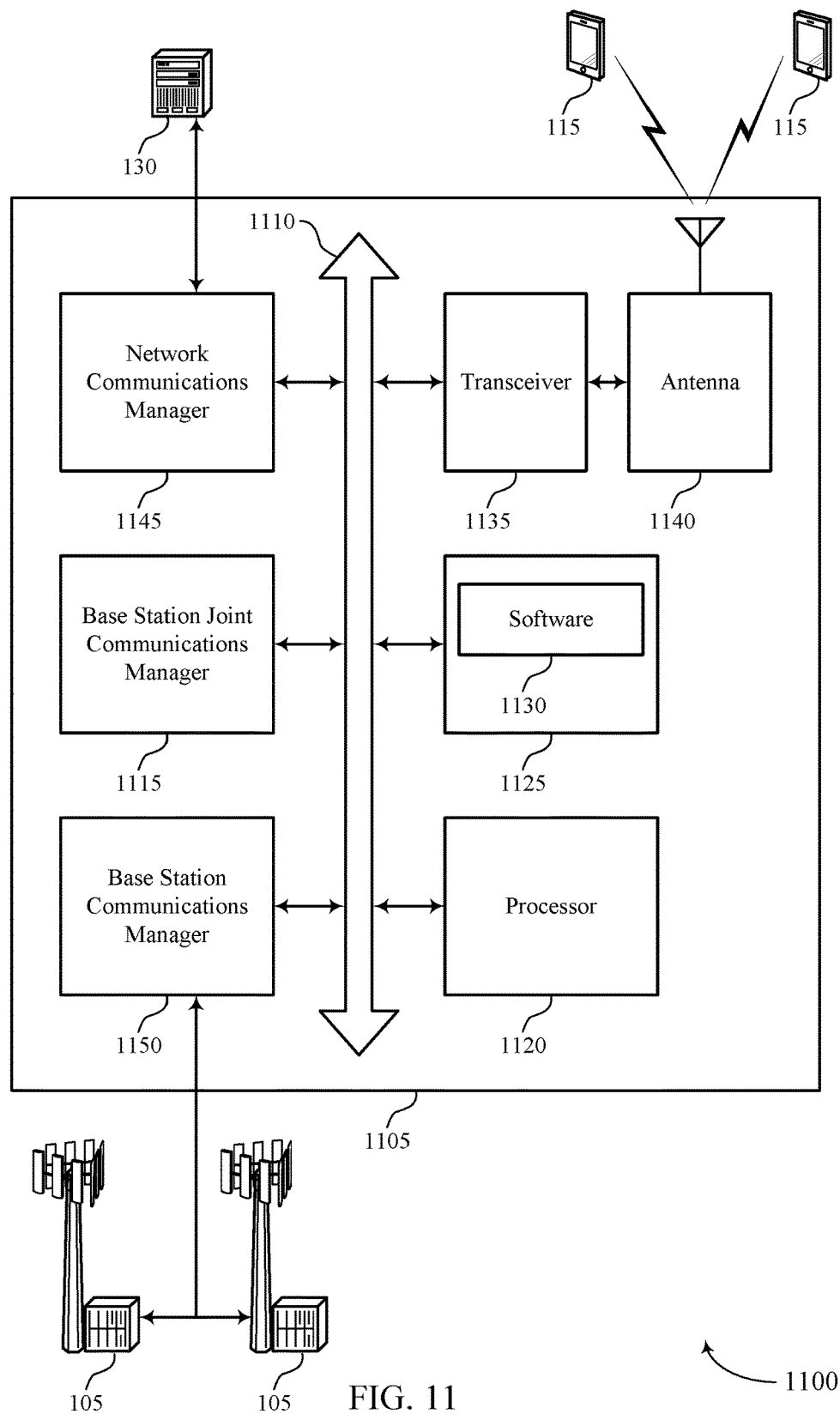
FIG. 11 illustrates a block diagram of a system including a base station that supports techniques for non-coherent joint transmissions in wireless communications in accordance with aspects of the present disclosure.

FIG. 11 shows a diagram of a system 1100 including a device 1105 that supports techniques for NCJTs in wireless communications in accordance with various aspects of the present disclosure. Device 1105 may be an example of or include the components of wireless device 805, wireless device 905, or a base station as described above, e.g., with reference to FIGS. 1-10. Device 1105 may include components for bi-directional voice and data communications including components for transmitting and receiving communications, including base station joint communications manager 1115, processor 1120, memory 1125, software 1130, transceiver 1135, antenna 1140, network communications manager 1145, and base station joint communications manager 1150. These components may be in electronic communication via one or more busses (e.g., bus 1110). Device 1105 may communicate wirelessly with one or more UEs 115.

Base station joint communications manager 1115 may manage communications with other base station 105, and may include a controller or scheduler for controlling communications with UEs 115 in cooperation with other base stations 105. For example, the base station joint communications manager 1115 may coordinate scheduling for transmissions to UEs 115 for various interference mitigation techniques such as beamforming or joint transmission. In some examples, base station joint communications manager 1115 may provide an X2 interface within an Long Term Evolution (LTE)/LTE-A wireless communication network technology to provide communication between base stations 105.

Processor 1120 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques for non-coherent joint transmissions in wireless communications).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware and/or software operation such as the interaction with peripheral components or devices.

Software 1130 may include code to implement aspects of the present disclosure, including code to support techniques for non-coherent joint transmissions in wireless communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network 130 (e.g., via one or more wired backhaul links). For example, the network communications manager 1145 may manage the transfer of data communications for client devices, such as one or more UEs 115.

Base station joint communications manager 1150 may manage communications with other base station 105, and may include a controller or scheduler for controlling communications with UEs 115 in cooperation with other base stations 105. For example, the base station joint communications manager 1150 may coordinate scheduling for transmissions to UEs 115 for various interference mitigation techniques such as beamforming or joint transmission. In some examples, base station joint communications manager 1150 may provide an X2 interface within an LTE/LTE-A wireless communication network technology to provide communication between base stations 105.

Figure 12:
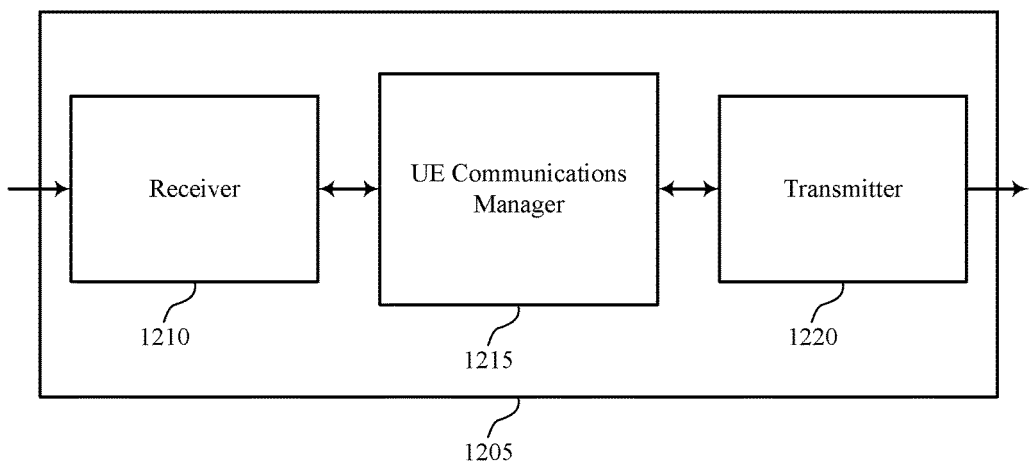
FIGS. 12 through 14 show block diagrams of a device that supports techniques for non-coherent joint transmissions in wireless communications in accordance with aspects of the present disclosure.

FIG. 12 shows a block diagram 1200 of a wireless device 1205 that supports techniques for NCJTs in wireless communications in accordance with various aspects of the present disclosure. Wireless device 1205 may be an example of aspects of a UE as described with reference to FIG. 1-7. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to techniques for NCJTs in wireless communications, etc.). Information may be passed on to other components of the device. The receiver 1210 may be an example of aspects of the transceiver 1535 described with reference to FIG. 15.

UE communications manager 1215 may be an example of aspects of the UE communications manager 1515 described with reference to FIG. 15. UE communications manager 1215 may receive a communication configuration for reception of a first portion of a NCJT from a first TP and a second portion of the NCJT from the first TP or a second TP and receive, based on the communication configuration, the first portion as a first codeword of a SU-MIMO transmission and the second portion as a second codeword of the SU-MIMO transmission.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may include a single antenna, or it may include a set of antennas.

Figure 13:
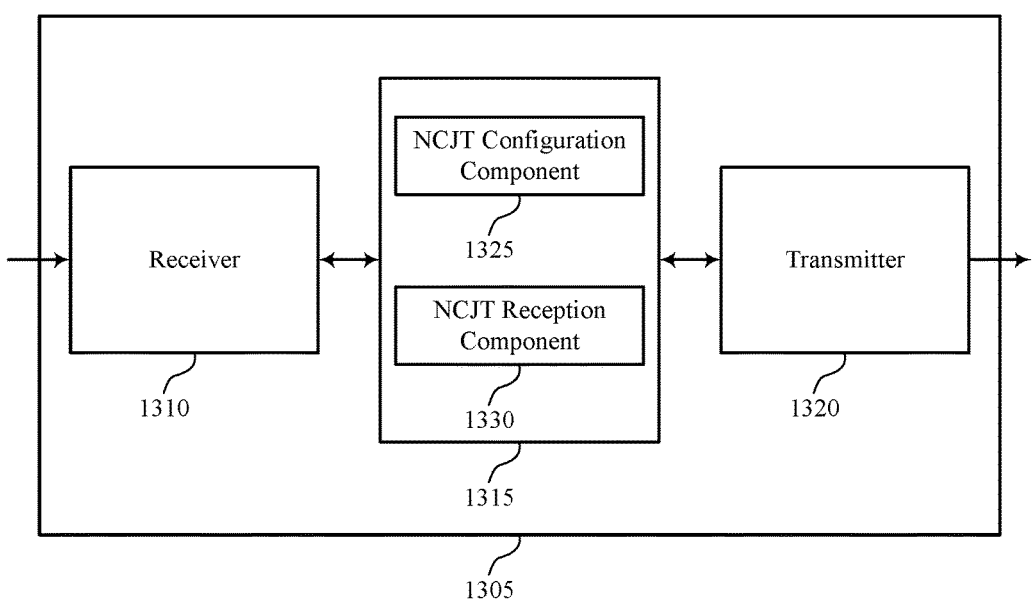

FIG. 13 shows a block diagram 1300 of a wireless device 1305 that supports techniques for NCJTs in wireless communications in accordance with various aspects of the present disclosure. Wireless device 1305 may be an example of aspects of a wireless device 1205 or a UE as described with reference to FIGS. 1-7 and 12. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques for NCJTs in wireless communications, etc.). Information may be passed on to other components of the device. The receiver 1310 may be an example of aspects of the transceiver 1535 described with reference to FIG. 15.

UE communications manager 1315 may be an example of aspects of the UE communications manager 1515 described with reference to FIG. 15. UE communications manager 1315 may also include NCJT configuration component 1325 and NCJT reception component 1330.

NCJT configuration component 1325 may receive (e.g., from the receiver 1310) a communication configuration for reception of a first portion of a NCJT from a first TP and a second portion of the NCJT from the first TP or a second TP. In some cases, the RBs for each of the first portion and the second portion are aligned RBs. In some cases, the communication configuration is received in a single DCI transmission.

NCJT reception component 1330 may receive, based on the communication configuration, the first portion as a first codeword of a SU-MIMO transmission and the second portion as a second codeword of the SU-MIMO transmission. In some cases, NCJT reception component 1330 may receive, based on the communication configuration, a transmission from only the first TP, the transmission formatted into two codewords in two spatial layers.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may include a single antenna, or it may include a set of antennas.

Figure 14:
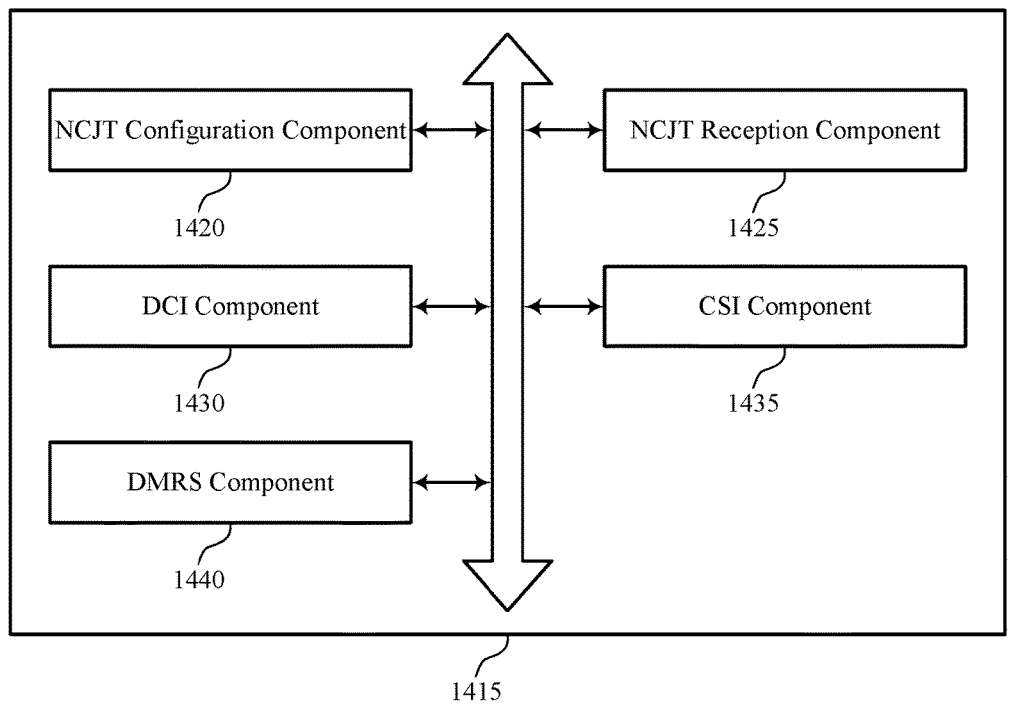

FIG. 14 shows a block diagram 1400 of a UE communications manager 1415 that supports techniques for NCJTs in wireless communications in accordance with various aspects of the present disclosure. The UE communications manager 1415 may be an example of aspects of a UE communications manager described with reference to FIGS. 12, 13, and 15. The UE communications manager 1415 may include NCJT configuration component 1420, NCJT reception component 1425, DCI component 1430, CSI component 1435, and DMRS component 1440. Each of these modules may communicate, directly or indirectly, with one another (e.g., via one or more buses).

NCJT configuration component 1420 may receive a communication configuration for reception of a first portion of a NCJT from a first TP and a second portion of the NCJT from a second TP. In some cases, the RBs for each of the first portion and the second portion are aligned RBs. In some cases, the communication configuration is received in a single DCI transmission.

NCJT reception component 1425 may receive, based on the communication configuration, the first portion as a first codeword of a SU-MIMO transmission and the second portion as a second codeword of the SU-MIMO transmission. In some cases, NCJT reception component 1425 may receive, based on the communication configuration, a transmission from only the first TP, the transmission formatted into two codewords in two spatial layers transmitted from the first TP.

DCI component 1430 may configure one or more parameters to receive the NCJT from both the first TP and the second TP, or configure the receiving of two codewords from the first TP. In some cases, the one or more parameters include one or more of an index to a table defining QCL information for each of the first TP and the second TP. In some cases, the DCI includes a field to indicate the antenna ports, scrambling ID, and number of layer for each of the first codeword and the second codeword. In some cases, the antenna ports, scrambling ID, and number of layers field, when only the first TP or the second TP is a serving cell, provides a same structure as a legacy SU-MIMO DCI information, and when both the first TP and the second TP are serving cells, provides support for any available number of spatial layers for the first codeword and the second codeword. In some cases, the antenna ports, scrambling ID, and number of layers field uses a same format as a same field in a legacy SU-MIMO configuration, and a number of spatial layers of the combination of the first codeword and the second codeword are the same as provided in the legacy SU-MIMO configuration. In some cases, the antenna ports, scrambling ID, and number of layers field further includes a swapping bit that indicates that the first codeword and second codeword in the antenna ports, scrambling ID, and number of layers field are for the second TP and first TP, respectively, instead of for the first TP and second TP, respectively.

CSI component 1435 may perform, based on the communication configuration, CSI processes for each of the first TP and the second TP. In some cases, the CSI processes include a first CSI process that assumes the first TP is a serving cell and a second CSI process that assumes the second TP is the serving cell. In some cases, the CSI processes include a first CSI process that assumes the first TP is a serving cell, a second CSI process that assumes the second TP is the serving cell, and a third CSI process that that assumes both the first TP and the second TP are the serving cells. In some cases, the third CSI process bundles a separate CSI process for each of the first TP and the second TP. In some cases, the third CSI process jointly encodes information from separate CSI process for each of the first TP and the second TP.

DMRS component 1440 may receive a DMRS in the first portion and the second portion. In some cases, the DMRS is received according to a pattern that is determined based on a total rank of a PDSCH transmission of the NCJT. In some cases, a first RI field indicates a DMRS port for the first TP and a second RI field indicates the DMRS port for the second TP.

Figure 15:
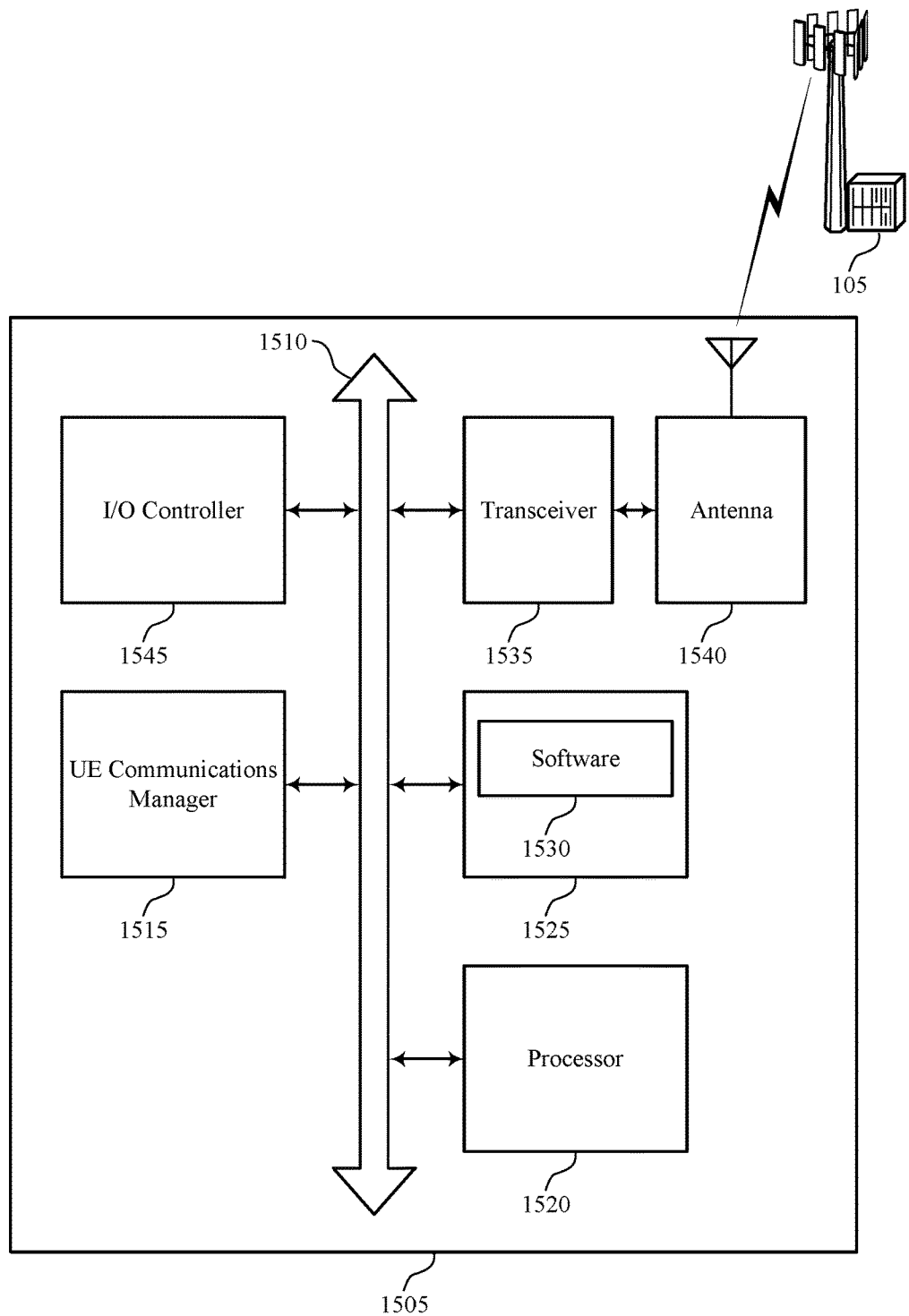
FIG. 15 illustrates a block diagram of a system including a UE that supports techniques for non-coherent joint transmissions in wireless communications in accordance with aspects of the present disclosure.

FIG. 15 shows a diagram of a system 1500 including a device 1505 that supports techniques for NCJTs in wireless communications in accordance with various aspects of the present disclosure. Device 1505 may be an example of or include the components of a UE as described above, e.g., with reference to FIGS. 1-7. Device 1505 may additionally or alternatively be an example of or include the components of a wireless device as described above, e.g., with reference to FIGS. 12-14. Device 1505 may include components for bi-directional voice and data communications including components for transmitting and receiving communications, including UE communications manager 1515, processor 1520, memory 1525, software 1530, transceiver 1535, antenna 1540, and I/O controller 1545. These components may be in electronic communication via one or more busses (e.g., bus 1510). Device 1505 may communicate wirelessly with one or more base stations 105.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting techniques for non-coherent joint transmissions in wireless communications).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware and/or software operation such as the interaction with peripheral components or devices.

Software 1530 may include code to implement aspects of the present disclosure, including code to support techniques for non-coherent joint transmissions in wireless communications. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

I/O controller 1545 may manage input and output signals for device 1505. I/O controller 1545 may also manage peripherals not integrated into device 1505. In some cases, I/O controller 1545 may represent a physical connection or port to an external peripheral. In some cases, I/O controller 1545 may utilize an operating system such as iOS®, ANDROID®, MS-DOS®, MS-WINDOWS®, OS/2®, UNIX®, LINUX®, or another known operating system.

Figure 16:
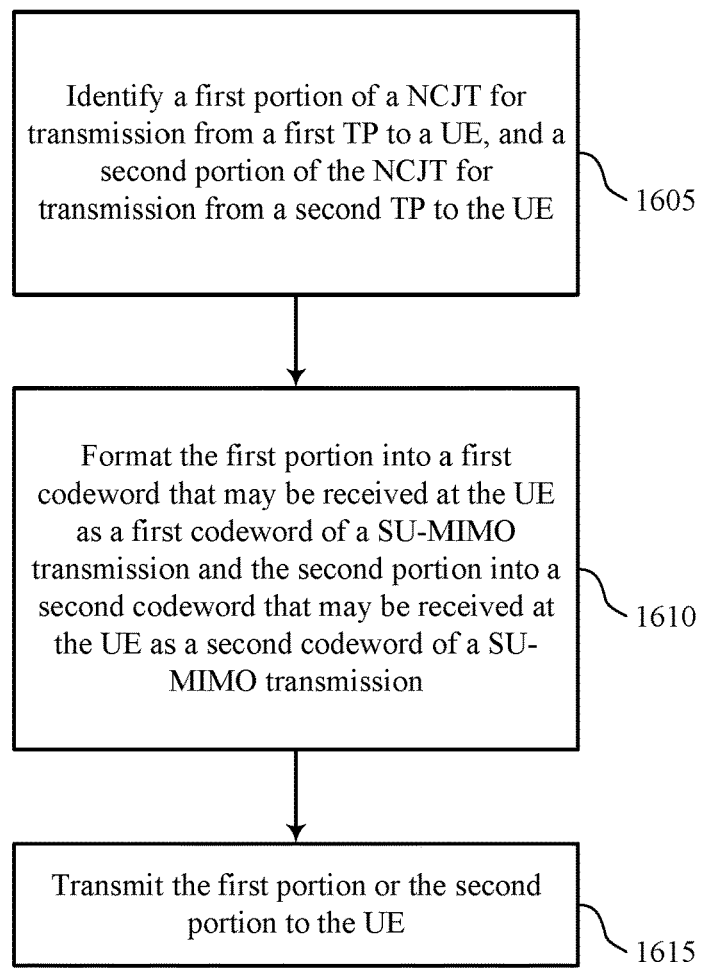
FIGS. 16 through 22 illustrate methods for techniques for non-coherent joint transmissions in wireless communications in accordance with aspects of the present disclosure.

FIG. 16 shows a flowchart illustrating a method 1600 for techniques for NCJTs in wireless communications in accordance with various aspects of the present disclosure. The operations of method 1600 may be implemented by a base station or its components as described herein. For example, the operations of method 1600 may be performed by a base station joint communications manager as described with reference to FIGS. 8 through 11. In some examples, a base station may execute a set of codes to control the functional elements of the device to perform the functions described below. Additionally or alternatively, the base station may perform aspects of the functions described below using special-purpose hardware.

At block 1605 the base station may identify a first portion of a NCJT for transmission from a first TP to a UE, and a second portion of the NCJT for transmission from the first TP or a second TP to the UE. The operations of block 1605 may be performed according to the methods described with reference to FIGS. 1 through 7. In certain examples, aspects of the operations of block 1605 may be performed by a NCJT identification component as described with reference to FIGS. 8 through 11.

At block 1610 the base station may format the first portion into a first codeword that may be received at the UE as a first codeword of a SU-MIMO transmission and the second portion into a second codeword that may be received at the UE as a second codeword of a SU-MIMO transmission. The operations of block 1610 may be performed according to the methods described with reference to FIGS. 1 through 7. In certain examples, aspects of the operations of block 1610 may be performed by a codeword formatting component as described with reference to FIGS. 8 through 11.

At block 1615 the base station may transmit the first portion and/or the second portion to the UE. The operations of block 1615 may be performed according to the methods described with reference to FIGS. 1 through 7. In certain examples, aspects of the operations of block 1615 may be performed by a NCJT transmission component as described with reference to FIGS. 8 through 11.

Figure 17:
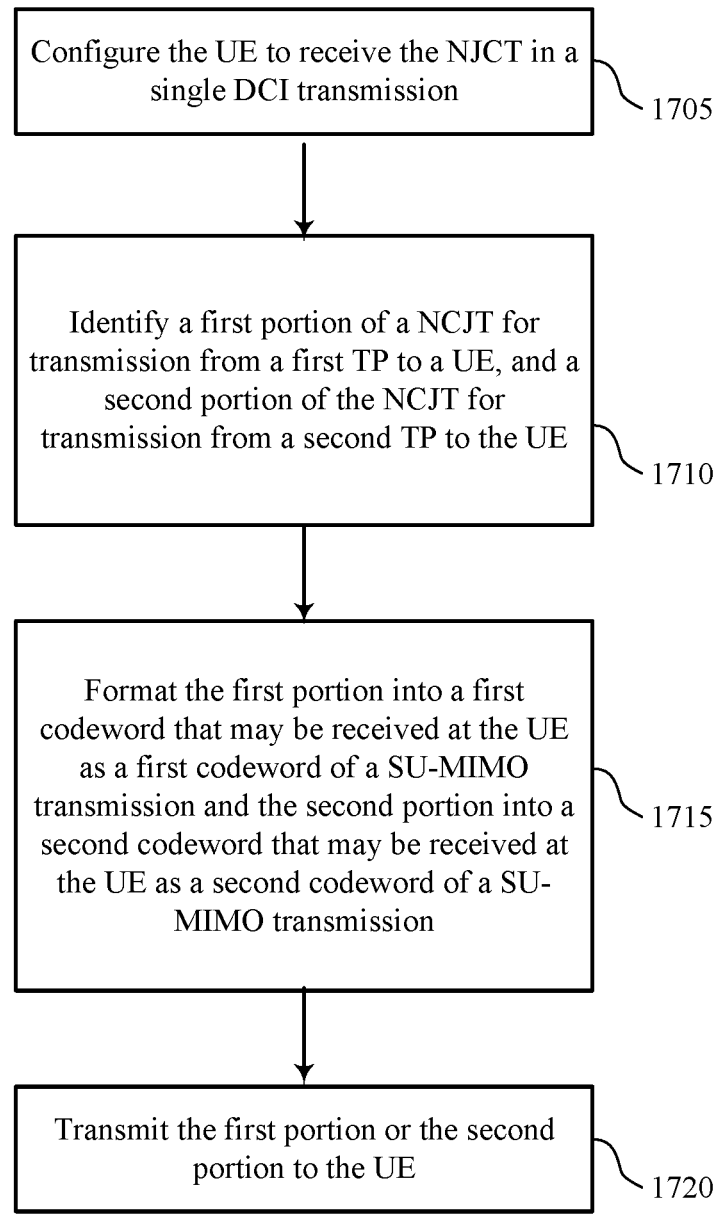

FIG. 17 shows a flowchart illustrating a method 1700 for techniques for NCJTs in wireless communications in accordance with various aspects of the present disclosure. The operations of method 1700 may be implemented by a base station or its components as described herein. For example, the operations of method 1700 may be performed by a base station joint communications manager as described with reference to FIGS. 8 through 11. In some examples, a base station may execute a set of codes to control the functional elements of the device to perform the functions described below. Additionally or alternatively, the base station may perform aspects of the functions described below using special-purpose hardware.

At block 1705 the base station may configure the UE to receive a NCJT in a single DCI transmission. The operations of block 1720 may be performed according to the methods described with reference to FIGS. 1 through 7. In certain examples, aspects of the operations of block 1720 may be performed by a configuration component as described with reference to FIGS. 8 through 11.

At block 1710 the base station may identify a first portion of a NCJT for transmission from a TP to a UE, and a second portion of the NCJT for transmission from a the first TP or a second TP to the UE. The operations of block 1710 may be performed according to the methods described with reference to FIGS. 1 through 7. In certain examples, aspects of the operations of block 1710 may be performed by a NCJT identification component as described with reference to FIGS. 8 through 11.

At block 1715 the base station may format the first portion into a first codeword that may be received at the UE as a first codeword of a SU-MIMO transmission and the second portion into a second codeword that may be received at the UE as a second codeword of a SU-MIMO transmission. The operations of block 1715 may be performed according to the methods described with reference to FIGS. 1 through 7. In certain examples, aspects of the operations of block 1715 may be performed by a codeword formatting component as described with reference to FIGS. 8 through 11.

At block 1720 the base station may transmit the first portion and/or the second portion to the UE. The operations of block 1720 may be performed according to the methods described with reference to FIGS. 1 through 7. In certain examples, aspects of the operations of block 1720 may be performed by a NCJT transmission component as described with reference to FIGS. 8 through 11.

Figure 18:
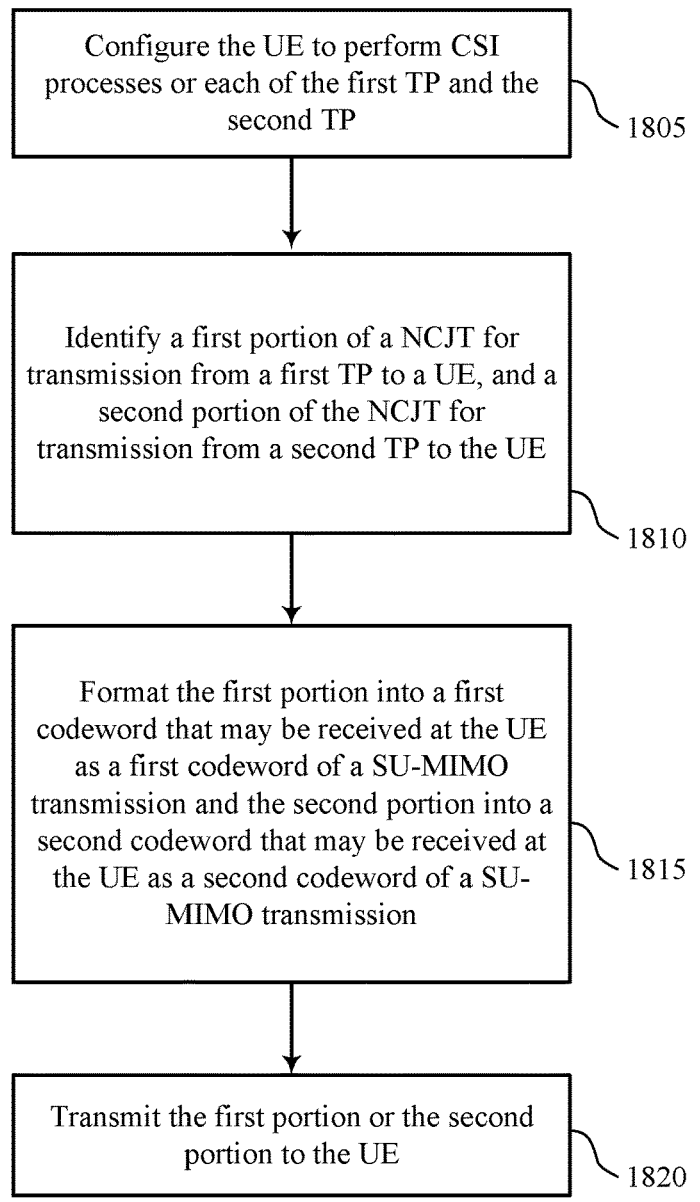

FIG. 18 shows a flowchart illustrating a method 1800 for techniques for NCJTs in wireless communications in accordance with various aspects of the present disclosure. The operations of method 1800 may be implemented by a base station or its components as described herein. For example, the operations of method 1800 may be performed by a base station joint communications manager as described with reference to FIGS. 8 through 11. In some examples, a base station may execute a set of codes to control the functional elements of the device to perform the functions described below. Additionally or alternatively, the base station may perform aspects of the functions described below using special-purpose hardware.

At block 1805 the base station may configure the UE to perform CSI processes for each of the first TP and the second TP. The operations of block 1805 may be performed according to the methods described with reference to FIGS. 1 through 7. In certain examples, aspects of the operations of block 1805 may be performed by a configuration component as described with reference to FIGS. 8 through 11.

At block 1810 the base station may identify a first portion of a NCJT for transmission from a first TP to a UE, and a second portion of the NCJT for transmission from the first TP or a second TP to the UE. The operations of block 1810 may be performed according to the methods described with reference to FIGS. 1 through 7. In certain examples, aspects of the operations of block 1810 may be performed by a NCJT identification component as described with reference to FIGS. 8 through 11.

At block 1815 the base station may format the first portion into a first codeword that may be received at the UE as a first codeword of a SU-MIMO transmission and the second portion into a second codeword that may be received at the UE as a second codeword of a SU-MIMO transmission. The operations of block 1815 may be performed according to the methods described with reference to FIGS. 1 through 7. In certain examples, aspects of the operations of block 1815 may be performed by a codeword formatting component as described with reference to FIGS. 8 through 11.

At block 1820 the base station may transmit the first portion or the second portion to the UE. The operations of block 1820 may be performed according to the methods described with reference to FIGS. 1 through 7. In certain examples, aspects of the operations of block 1820 may be performed by a NCJT transmission component as described with reference to FIGS. 8 through 11.

Figure 19:
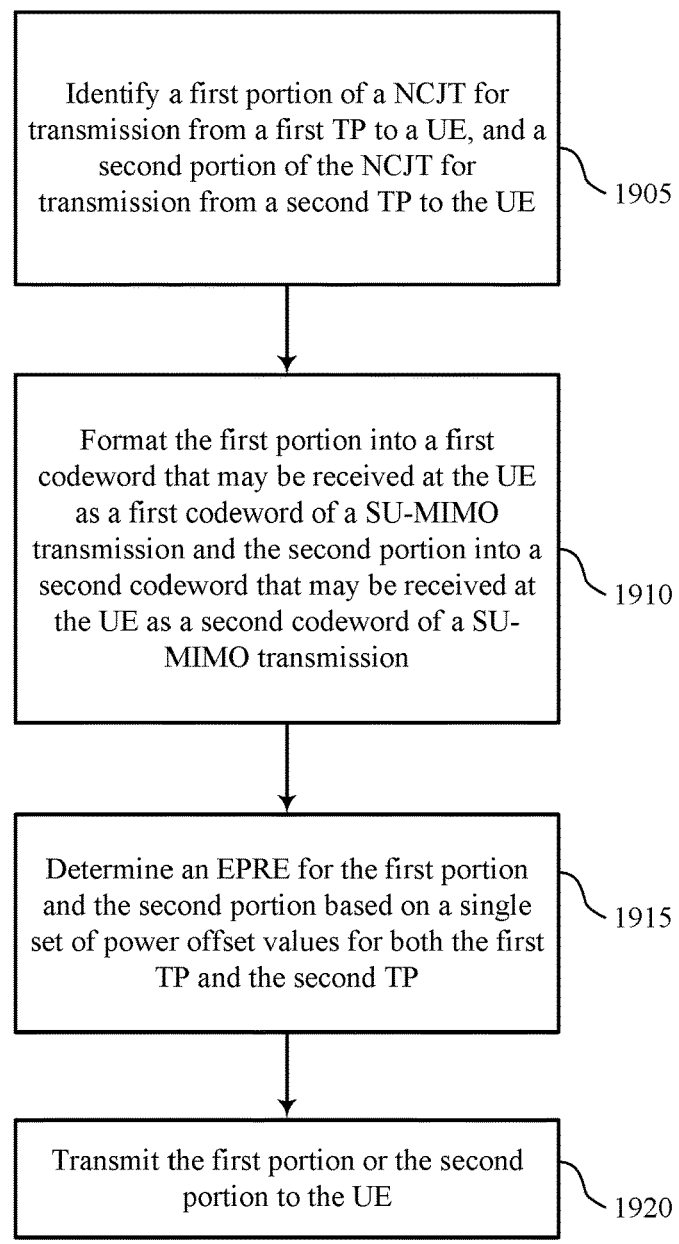

FIG. 19 shows a flowchart illustrating a method 1900 for techniques for NCJTs in wireless communications in accordance with various aspects of the present disclosure. The operations of method 1900 may be implemented by a base station or its components as described herein. For example, the operations of method 1900 may be performed by a base station joint communications manager as described with reference to FIGS. 8 through 11. In some examples, a base station may execute a set of codes to control the functional elements of the device to perform the functions described below. Additionally or alternatively, the base station may perform aspects of the functions described below using special-purpose hardware.

At block 1905 the base station may identify a first portion of a NCJT for transmission from a first TP to a UE, and a second portion of the NCJT for transmission from the first TP or a second TP to the UE. The operations of block 1905 may be performed according to the methods described with reference to FIGS. 1 through 7. In certain examples, aspects of the operations of block 1905 may be performed by a NCJT identification component as described with reference to FIGS. 8 through 11.

At block 1910 the base station may format the first portion into a first codeword that may be received at the UE as a first codeword of a SU-MIMO transmission and the second portion into a second codeword that may be received at the UE as a second codeword of a SU-MIMO transmission. The operations of block 1910 may be performed according to the methods described with reference to FIGS. 1 through 7. In certain examples, aspects of the operations of block 1910 may be performed by a codeword formatting component as described with reference to FIGS. 8 through 11.

At block 1915 the base station may transmit the first portion and/or the second portion to the UE. The operations of block 1915 may be performed according to the methods described with reference to FIGS. 1 through 7. In certain examples, aspects of the operations of block 1915 may be performed by a NCJT transmission component as described with reference to FIGS. 8 through 11.

At block 1920 the base station may determine an EPRE for the first portion and the second portion based on a single set of power offset values for both the first TP and the second TP. The operations of block 1920 may be performed according to the methods described with reference to FIGS. 1 through 7. In certain examples, aspects of the operations of block 1920 may be performed by a TPC component as described with reference to FIGS. 8 through 11.

Figure 20:
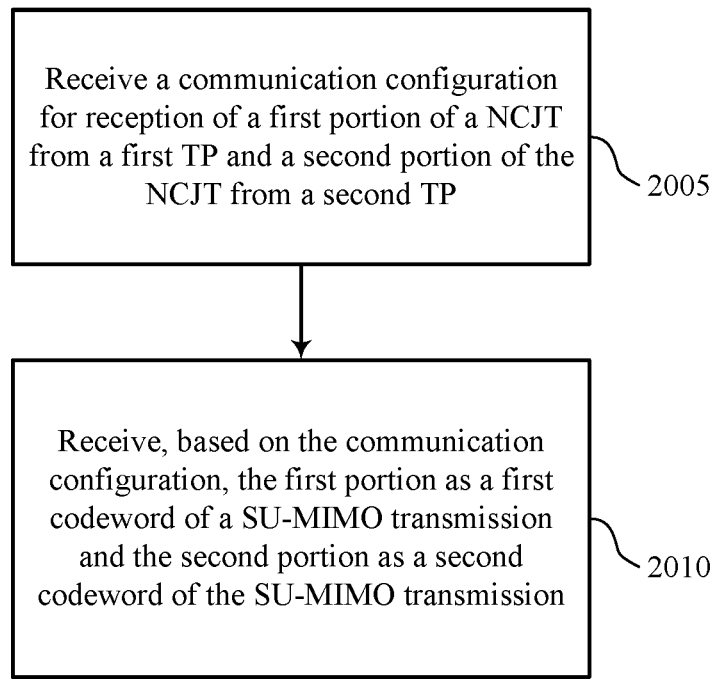

FIG. 20 shows a flowchart illustrating a method 2000 for techniques for NCJTs in wireless communications in accordance with various aspects of the present disclosure. The operations of method 2000 may be implemented by a UE or its components as described herein. For example, the operations of method 2000 may be performed by a UE communications manager as described with reference to FIGS. 12 through 15. In some examples, a UE may execute a set of codes to control the functional elements of the device to perform the functions described below. Additionally or alternatively, the UE may perform aspects of the functions described below using special-purpose hardware.

At block 2005 the UE may receive a communication configuration for reception of a first portion of a NCJT from a first TP and a second portion of the NCJT from the first TP or a second TP. The operations of block 2005 may be performed according to the methods described with reference to FIGS. 1 through 7. In certain examples, aspects of the operations of block 2005 may be performed by a NCJT configuration component as described with reference to FIGS. 12 through 15.

At block 2010 the UE may receive, based at least in part on the communication configuration, the first portion as a first codeword of a SU-MIMO transmission and the second portion as a second codeword of the SU-MIMO transmission. The operations of block 2010 may be performed according to the methods described with reference to FIGS. 1 through 7. In certain examples, aspects of the operations of block 2010 may be performed by a NCJT reception component as described with reference to FIGS. 12 through 15.

Figure 21:
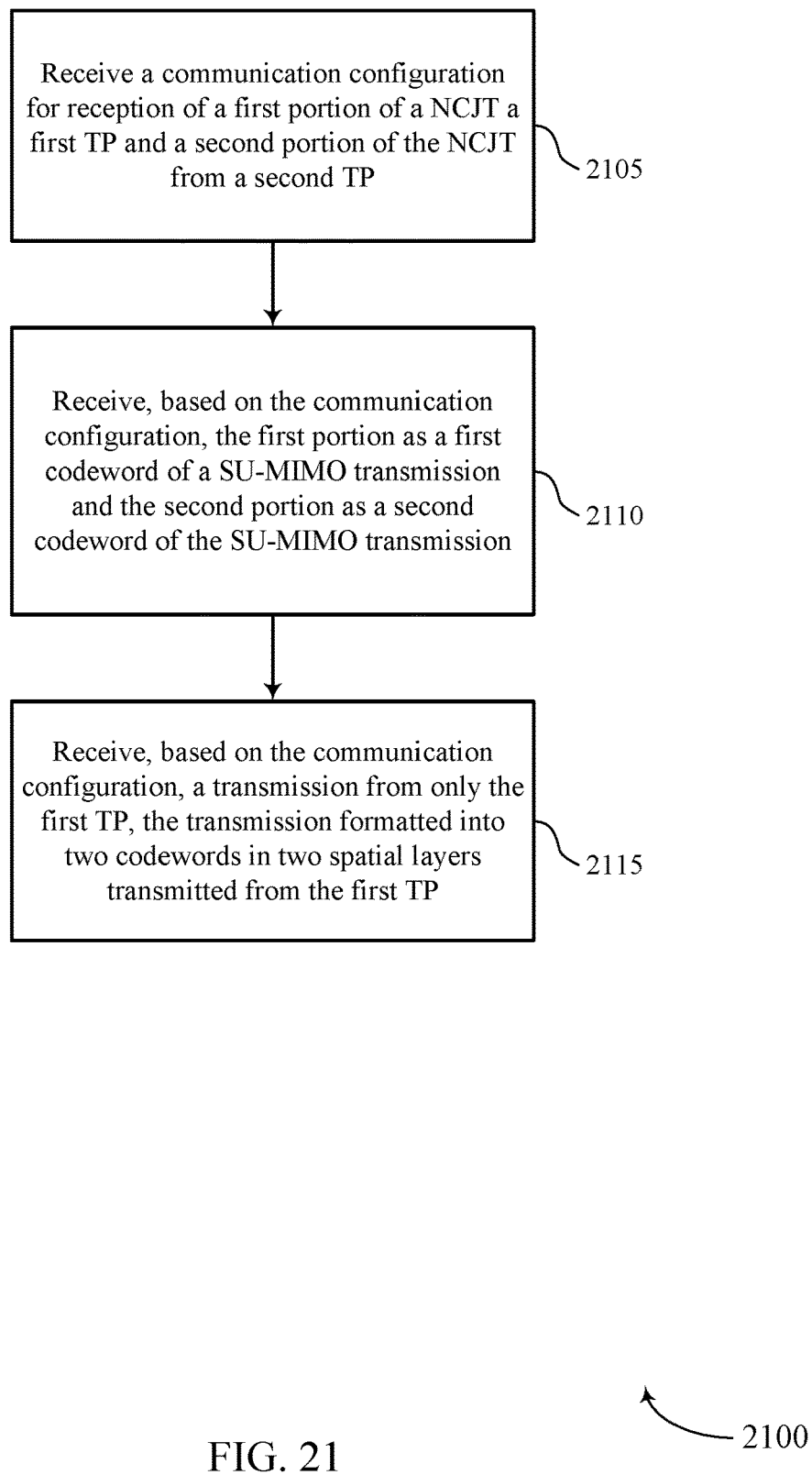

FIG. 21 shows a flowchart illustrating a method 2100 for techniques for NCJTs in wireless communications in accordance with various aspects of the present disclosure. The operations of method 2100 may be implemented by a UE or its components as described herein. For example, the operations of method 2100 may be performed by a UE communications manager as described with reference to FIGS. 12 through 15. In some examples, a UE may execute a set of codes to control the functional elements of the device to perform the functions described below. Additionally or alternatively, the UE may perform aspects of the functions described below using special-purpose hardware.

At block 2105 the UE may receive a communication configuration for reception of a first portion of a NCJT from a first TP and a second portion of the NCJT from the first TP or a second TP. The operations of block 2105 may be performed according to the methods described with reference to FIGS. 1 through 7. In certain examples, aspects of the operations of block 2105 may be performed by a NCJT configuration component as described with reference to FIGS. 12 through 15.

At block 2110 the UE may receive, based at least in part on the communication configuration, the first portion as a first codeword of a SU-MIMO transmission and the second portion as a second codeword of the SU-MIMO transmission. The operations of block 2110 may be performed according to the methods described with reference to FIGS. 1 through 7. In certain examples, aspects of the operations of block 2110 may be performed by a NCJT reception component as described with reference to FIGS. 12 through 15.

At block 2115 the UE may receive, based at least in part on the communication configuration, a transmission from only the first TP, the transmission formatted into two codewords in two spatial layers transmitted from the first TP. The operations of block 2115 may be performed according to the methods described with reference to FIGS. 1 through 7. In certain examples, aspects of the operations of block 2115 may be performed by a NCJT reception component as described with reference to FIGS. 12 through 15.

Figure 22:
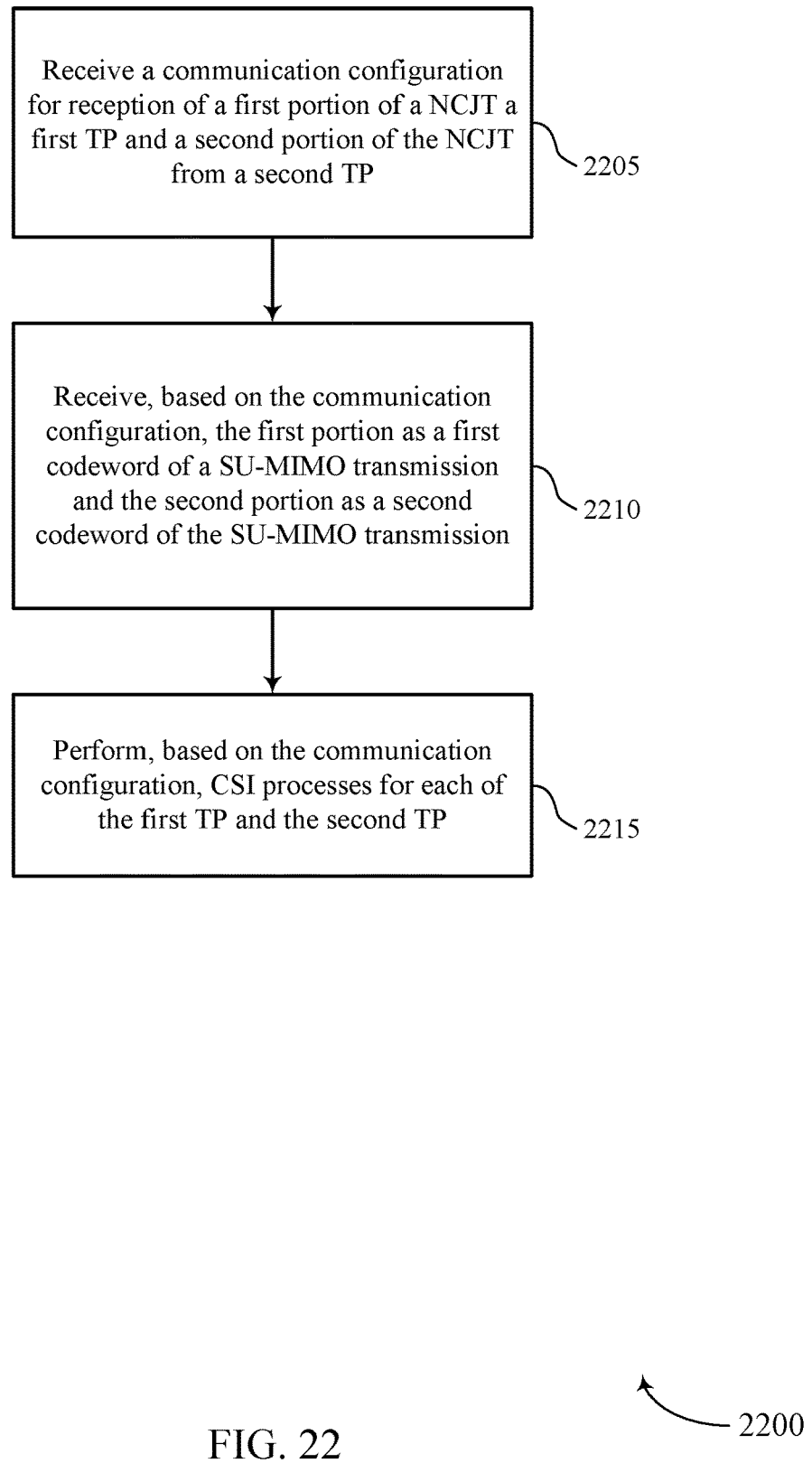

FIG. 22 shows a flowchart illustrating a method 2200 for techniques for NCJTs in wireless communications in accordance with various aspects of the present disclosure. The operations of method 2200 may be implemented by a UE or its components as described herein. For example, the operations of method 2200 may be performed by a UE communications manager as described with reference to FIGS. 12 through 15. In some examples, a UE may execute a set of codes to control the functional elements of the device to perform the functions described below. Additionally or alternatively, the UE may perform aspects of the functions described below using special-purpose hardware.

At block 2205 the UE may receive a communication configuration for reception of a first portion of a NCJT from a first TP and a second portion of the NCJT from the first TP or a second TP. The operations of block 2205 may be performed according to the methods described with reference to FIGS. 1 through 7. In certain examples, aspects of the operations of block 2205 may be performed by a NCJT configuration component as described with reference to FIGS. 12 through 15.

At block 2210 the UE may receive, based at least in part on the communication configuration, the first portion as a first codeword of a SU-MIMO transmission and the second portion as a second codeword of the SU-MIMO transmission. The operations of block 2210 may be performed according to the methods described with reference to FIGS. 1 through 7. In certain examples, aspects of the operations of block 2210 may be performed by a NCJT reception component as described with reference to FIGS. 12 through 15.

At block 2215 the UE may perform, based at least in part on the communication configuration, CSI processes for each of the first TP and the second TP. The operations of block 2215 may be performed according to the methods described with reference to FIGS. 1 through 7. In certain examples, aspects of the operations of block 2215 may be performed by a CSI component as described with reference to FIGS. 12 through 15.

It should be noted that the methods described above describe possible implementations, and that the operations and the steps may be rearranged or otherwise modified and that other implementations are possible. Furthermore, aspects from two or more of the methods 1600, 1700, 1800, 1900, 2000, 2100, 2200, or 2300 described with reference to FIG. 16, 17, 18, 19, 20, 21, 22, or 23 may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, i.e. a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a communication configuration for reception of a first portion of a non-coherent joint transmission (NCJT) from a first transmission point (TP) and a second portion of the NCJT from the first TP or a second TP, wherein the communication configuration is received in a single downlink control information (DCI) transmission; and
receiving, based at least in part on the communication configuration, the first portion as a first codeword of a single-user multiple-input multiple-output (SU-MIMO) transmission and the second portion as a second codeword of the SU-MIMO transmission, wherein the DCI transmission comprises a field to indicate antenna ports, a scrambling ID, and a number of layers for each of the first codeword and the second codeword that:
  provides a same structure as a legacy SU-MIMO DCI transmission when only the first TP or the second TP is a serving cell; and
  provides support for any available number of spatial layers for the first codeword and the second codeword when both the first TP and the second TP are serving cells.

2. The method of claim 1, wherein resource blocks for each of the first portion and the second portion are aligned resource blocks.

3. The method of claim 1, wherein the receiving the first portion and the second portion comprises:
  receiving, based at least in part on the communication configuration, the SU-MIMO transmission from only the first TP, the SU-MIMO transmission formatted into two codewords in two spatial layers transmitted from the first TP.

4. The method of claim 1, wherein the DCI transmission comprises one or more parameters to configure the receiving the NCJT from both the first TP and the second TP, or to configure the receiving of two codewords from the first TP.

5. The method of claim 4, wherein the one or more parameters comprise an index to a table defining quasi co-location (QCL) information for each of the first TP and the second TP.

6. The method of claim 5, wherein:
  the index comprises a plurality of bits of information to indicate a combination of QCL information in the table.

7. The method of claim 6, wherein different combinations in the table indicate whether the UE is to receive the NCJT from both the first TP and the second TP, or the UE is to receive the NCJT from only one of the first TP or the second TP.

8. The method of claim 6, wherein the plurality of bits of information jointly encode the QCL for both the first TP and the second TP.

9. The method of claim 6, wherein the plurality of bits of information comprise two fields that separately specify the QCL for the first TP and the second TP.

10. The method of claim 1, wherein the antenna ports, scrambling ID, and number of layers field uses a same format as a same field in a legacy SU-MIMO configuration, and a number of spatial layers of a combination of the first codeword and the second codeword are the same as provided in the legacy SU-MIMO configuration.

11. The method of claim 10, wherein the antenna ports, scrambling ID, and number of layers field further includes a swapping bit that indicates that the first codeword and second codeword in the antenna ports, scrambling ID, and number of layers field are for the second TP and first TP, respectively, instead of for the first TP and second TP, respectively.

12. The method of claim 1, further comprising:
  performing, based at least in part on the communication configuration, channel state information (CSI) processes for each of the first TP and the second TP.

13. The method of claim 12, wherein the CSI processes comprise a first CSI process that assumes the first TP is a serving cell and a second CSI process that assumes the second TP is the serving cell.

14. The method of claim 12, wherein the CSI processes comprise a first CSI process that assumes the first TP is a serving cell, a second CSI process that assumes the second TP is the serving cell, and a third CSI process that that assumes both the first TP and the second TP are serving cells.

15. The method of claim 14, wherein the third CSI process bundles a separate CSI process for each of the first TP and the second TP.

16. The method of claim 14, wherein the third CSI process jointly encodes information from separate CSI processes for each of the first TP and the second TP.

17. The method of claim 12, wherein the first CSI process and second CSI process each contain a rank indicator (RI), precoding matrix indicator (PMI), and a channel quality indicator (CQI) for the first TP and the second TP, respectively.

18. The method of claim 17, wherein the RI in the CSI processes is restricted to cover a maximum total rank.

19. The method of claim 17, wherein a third CSI process contains two sets of RI, PMI, and CQI when both the first TP and the second TP are serving cells, and provides support for any available number of spatial layers for the first codeword and the second codeword.

20. The method of claim 17, wherein a third CSI process contains two sets of RI, PMI, and CQI when both the first TP and the second TP are serving cells, and provides support for a number of spatial layers of a combination of the first codeword and the second codeword that is the same as provided in a legacy SU-MIMO configuration.

21. The method of claim 17, wherein a third CSI process contains two sets of RI, PMI, and CQI when both the first TP and the second TP are serving cells, and wherein the DCI transmission comprises a swapping bit that indicates RI, PMI, and CQI for the first codeword and second codeword are for the second TP and first TP, respectively, instead of for the first TP and second TP, respectively.

22. The method of claim 1, wherein the receiving the first portion and the second portion further comprises:
  receiving a demodulation reference signal (DMRS) in the first portion and the second portion.

23. The method of claim 22, wherein the DMRS is received according to a pattern that is determined based on a total rank of a physical downlink shared channel (PDSCH) transmission of the NCJT.

24. The method of claim 22, wherein a first rank indicator (RI) field indicates a DMRS port for the first TP and a second RI field indicates a DMRS port for the second TP.

25. A method for wireless communication, comprising:
  identifying a first portion of a non-coherent joint transmission (NCJT) for transmission from a first transmission point (TP) to a user equipment (UE), and a second portion of the NCJT for transmission from the first TP or a second TP to the UE;
  configuring the UE to receive the NCJT in a single downlink control information (DCI) transmission;
  formatting at least one of the first portion into a first codeword that may be received at the UE as a first codeword of a single-user multiple-input multiple-output (SU-MIMO) transmission or the second portion into a second codeword that may be received at the UE as a second codeword of the SU-MIMO transmission; and
  transmitting the at least one of the first portion or the second portion to the UE,
  wherein the DCI transmission comprises a field to indicate antenna ports, a scrambling ID, and a number of layers for each of the first codeword and the second codeword that:

provides a same structure as a legacy SU-MIMO DCI transmission when only the first TP or the second TP is a serving cell; and
provides support for any available number of spatial layers for the first codeword and the second codeword when both the first TP and the second TP are serving cells.

26. The method of claim 25, wherein the formatting further comprises:
allocating resource blocks for each of the first portion and the second portion to provide aligned resource blocks at the UE.

27. The method of claim 25, wherein the transmitting further comprises:
transmitting the first portion formatted into the first codeword in a first spatial layer and the second portion formatted into the second codeword in a second spatial layer.

28. The method of claim 25, wherein the DCI transmission comprises one or more parameters to configure the UE to receive the NCJT from both the first TP and the second TP, or to configure the UE to receive two codewords in two spatial layers from either the first TP or the second TP.

29. The method of claim 28, wherein the one or more parameters comprise an index to a table defining quasi co-location (QCL) information for each of the first TP and the second TP.

30. The method of claim 25, further comprising:
configuring the UE to perform channel state information (CSI) processes for each of the first TP and the second TP.

31. The method of claim 25, wherein the formatting further comprises:
rate matching physical downlink shared channel (PDSCH) information around one or more reference signal transmissions from one or more of the first TP or the second TP.

32. The method of claim 31, wherein the PDSCH information is rate matched around reference signal transmissions of both the first TP and the second TP.

33. The method of claim 31, wherein the PDSCH information transmitted from the first TP is rate matched around reference signal transmissions of only the first TP.

34. The method of claim 25, further comprising:
determining an energy per resource element (EPRE) for the first portion and the second portion based on a single set of power offset values for both the first TP and the second TP.

35. The method of claim 34, wherein the single set of power offset values correspond to a set of power offset values associated with the first TP or a fixed set of power offset values.

36. The method of claim 25, further comprising:
determining a first energy per resource element (EPRE) for the first portion based on a first set of power offset values for the first TP; and
determining a second EPRE for the second portion based on a second set of power offset values for the second TP.

37. An apparatus for wireless communication, comprising:
means for receiving a communication configuration for reception of a first portion of a non-coherent joint transmission (NCJT) from a first transmission point (TP) and a second portion of the NCJT from the first TP or a second TP, wherein the communication configuration is received in a single downlink control information (DCI) transmission; and
means for receiving, based at least in part on the communication configuration, the first portion as a first codeword of a single-user multiple-input multiple-output (SU-MIMO) transmission and the second portion as a second codeword of the SU-MIMO transmission,
wherein the DCI transmission comprises a field to indicate antenna ports, a scrambling ID, and a number of layers for each of the first codeword and the second codeword that:
provides a same structure as a legacy SU-MIMO DCI transmission when only the first TP or the second TP is a serving cell; and
provides support for any available number of spatial layers for the first codeword and the second codeword when both the first TP and the second TP are serving cells.

38. An apparatus for wireless communication, comprising:
means for identifying a first portion of a non-coherent joint transmission (NCJT) for transmission from a first transmission point (TP) to a user equipment (UE), and a second portion of the NCJT for transmission from the first TP or a second TP to the UE;
means for configuring the UE to receive the NCJT in a single downlink control information (DCI) transmission;
means for formatting at least one of the first portion into a first codeword that may be received at the UE as a first codeword of a single-user multiple-input multiple-output (SU-MIMO) transmission and the second portion into a second codeword that may be received at the UE as a second codeword of a SU-MIMO transmission; and
means for transmitting the at least one of the first portion or the second portion to the UE,
wherein the DCI transmission comprises a field to indicate antenna ports, a scrambling ID, and a number of layers for each of the first codeword and the second codeword that:
provides a same structure as a legacy SU-MIMO DCI transmission when only the first TP or the second TP is a serving cell; and
provides support for any available number of spatial layers for the first codeword and the second codeword when both the first TP and the second TP are serving cells.

39. An apparatus for wireless communication, comprising:
a processor;
memory in electronic communication with the processor; and
instructions stored in the memory and operable, when executed by the processor, to cause the apparatus to:
receive a communication configuration for reception of a first portion of a non-coherent joint transmission (NCJT) from a first transmission point (TP) and a second portion of the NCJT from the first TP or a second TP, wherein the communication configuration is received in a single downlink control information (DCI) transmission; and
receive, based at least in part on the communication configuration, the first portion as a first codeword of a single-user multiple-input multiple-output (SU-MIMO) transmission and the second portion as a second codeword of the SU-MIMO transmission, wherein the DCI transmission comprises a field to indicate antenna ports, a scrambling ID, and a number of layers for each of the first codeword and the second codeword that:
provides a same structure as a legacy SU-MIMO DCI transmission when only the first TP or the second TP is a serving cell; and
provides support for any available number of spatial layers for the first codeword and the second codeword when both the first TP and the second TP are serving cells.

40. The apparatus of claim 39, wherein resource blocks for each of the first portion and the second portion are aligned resource blocks.

41. The apparatus of claim 39, wherein the instructions are further executable by the processor to cause the apparatus to:
receive, based at least in part on the communication configuration, the SU-MIMO transmission from only the first TP, the SU-MIMO transmission formatted into two codewords in two spatial layers transmitted from the first TP.

42. The apparatus of claim 39, wherein the DCI transmission comprises one or more parameters, and wherein the instructions are operable, based on the one or more parameters, to cause the apparatus to receive the NCJT from both the first TP and the second TP, or to receive two codewords from the first TP.

43. The apparatus of claim 42, wherein the one or more parameters comprise an index to a table defining quasi co-location (QCL) information for each of the first TP and the second TP.

44. The apparatus of claim 43, wherein the index comprises a plurality of bits of information to indicate a combination of QCL information in the table.

45. The apparatus of claim 44, wherein different combinations in the table indicate whether the apparatus is to receive the NCJT from both the first TP and the second TP, or the apparatus is to receive the NCJT from only one of the first TP or the second TP.

46. The apparatus of claim 44, wherein the plurality of bits of information jointly encode the QCL for both the first TP and the second TP.

47. The apparatus of claim 44, wherein the plurality of bits of information comprises two fields that separately specify the QCL for the first TP and the second TP.

48. The apparatus of claim 39, wherein the antenna ports, scrambling ID, and number of layers field uses a same format as a same field in a legacy SU-MIMO configuration, and a number of spatial layers of a combination of the first codeword and the second codeword are the same as provided in the legacy SU-MIMO configuration.

49. The apparatus of claim 48, wherein the antenna ports, scrambling ID, and number of layers field further includes a swapping bit that indicates that the first codeword and second codeword in the antenna ports, scrambling ID, and number of layers field are for the second TP and first TP, respectively, instead of for the first TP and second TP, respectively.

50. The apparatus of claim 39, wherein the instructions are further executable by the processor to cause the apparatus to:
perform, based at least in part on the communication configuration, channel state information (CSI) processes for each of the first TP and the second TP.

51. The apparatus of claim 50, wherein the CSI processes comprise a first CSI process that assumes the first TP is a serving cell and a second CSI process that assumes the second TP is the serving cell.

52. The apparatus of claim 50, wherein the CSI processes comprise a first CSI process that assumes the first TP is a serving cell, a second CSI process that assumes the second TP is the serving cell, and a third CSI process that that assumes both the first TP and the second TP are serving cells.

53. The apparatus of claim 52, wherein the third CSI process bundles a separate CSI process for each of the first TP and the second TP.

54. The apparatus of claim 52, wherein the third CSI process jointly encodes information from separate CSI processes for each of the first TP and the second TP.

55. The apparatus of claim 50, wherein the first CSI process and second CSI process each contain a rank indicator (RI), precoding matrix indicator (PMI), and a channel quality indicator (CQI) for the first TP and the second TP, respectively.

56. The apparatus of claim 55, wherein the RI in the CSI processes is restricted to cover a maximum total rank.

57. The apparatus of claim 55, wherein a third CSI process contains two sets of RI, PMI, and CQI when both the first TP and the second TP are serving cells, and provides support for any available number of spatial layers for the first codeword and the second codeword.

58. The apparatus of claim 55, wherein a third CSI process contains two sets of RI, PMI, and CQI when both the first TP and the second TP are serving cells, and provides support for a number of spatial layers of a combination of the first codeword and the second codeword that is the same as provided in a legacy SU-MIMO configuration.

59. The apparatus of claim 55, wherein a third CSI process contains two sets of RI, PMI, and CQI when both the first TP and the second TP are serving cells, and wherein the DCI transmission comprises a swapping bit that indicates RI, PMI, and CQI for the first codeword and second codeword are for the second TP and first TP, respectively, instead of for the first TP and second TP, respectively.

60. The apparatus of claim 39, wherein the instructions are further executable by the processor to cause the apparatus to:
receive a demodulation reference signal (DMRS) in the first portion and the second portion.

61. The apparatus of claim 60, wherein the DMRS is received according to a pattern that is determined based on a total rank of a physical downlink shared channel (PDSCH) transmission of the NCJT.

62. The apparatus of claim 60, wherein a first rank indicator (RI) field indicates a DMRS port for the first TP and a second RI field indicates a DMRS port for the second TP.

63. An apparatus for wireless communication, comprising:
a processor;
memory in electronic communication with the processor; and
instructions stored in the memory and operable, when executed by the processor, to cause the apparatus to:
identify a first portion of a non-coherent joint transmission (NCJT) for transmission from a first transmission point (TP) to a user equipment (UE), and a second portion of the NCJT for transmission from the first TP or a second TP to the UE;
configure the UE to receive the NCJT in a single downlink control information (DCI) transmission;
format at least one of the first portion into a first codeword that may be received at the UE as a first codeword of a single-user multiple-input multiple-output (SU-MIMO) transmission and the second portion into a second codeword that may be received at the UE as a second codeword of a SU-MIMO transmission; and transmit the at least one of the first portion or the second portion to the UE, wherein the DCI transmission comprises a field to indicate antenna ports, a scrambling ID, and a number of layers for each of the first codeword and the second codeword that:

provides a same structure as a legacy SU-MIMO DCI transmission when only the first TP or the second TP is a serving cell; and provides support for any available number of spatial layers for the first codeword and the second codeword when both the first TP and the second TP are serving cells.

64. A non-transitory computer readable medium storing code for wireless communication at a user equipment (UE), the code comprising instructions executable by a processor to:

receive a communication configuration for reception of a first portion of a non-coherent joint transmission (NCJT) from a first transmission point (TP) and a second portion of the NCJT from the first TP or a second TP, wherein the communication configuration is received in a single downlink control information (DCI) transmission; and receive, based at least in part on the communication configuration, the first portion as a first codeword of a single-user multiple-input multiple-output (SU-MIMO) transmission and the second portion as a second codeword of the SU-MIMO transmission, wherein the DCI transmission comprises a field to indicate antenna ports, a scrambling ID, and a number of layers for each of the first codeword and the second codeword that:

provides a same structure as a legacy SU-MIMO DCI transmission when only the first TP or the second TP is a serving cell; and provides support for any available number of spatial layers for the first codeword and the second codeword when both the first TP and the second TP are serving cells.

65. A non-transitory computer readable medium storing code for wireless communication at a first transmission point (TP), the code comprising instructions executable by a processor to:

identify a first portion of a non-coherent joint transmission (NCJT) for transmission from the first TP to a user equipment (UE), and a second portion of the NCJT for transmission from the first TP or a second TP to the UE;

configure the UE to receive the NCJT in a single downlink control information (DCI) transmission;

format at least one of the first portion into a first codeword that may be received at the UE as a first codeword of a single-user multiple-input multiple-output (SU-MIMO) transmission and the second portion into a second codeword that may be received at the UE as a second codeword of a SU-MIMO transmission; and transmit the at least one of the first portion or the second portion to the UE, wherein the DCI transmission comprises a field to indicate antenna ports, a scrambling ID, and a number of layers for each of the first codeword and the second codeword that:

provides a same structure as a legacy SU-MIMO DCI transmission when only the first TP or the second TP is a serving cell; and provides support for any available number of spatial layers for the first codeword and the second codeword when both the first TP and the second TP are serving cells.

* * * * *